(12) United States Patent
Gabrielson et al.

(10) Patent No.: US 12,134,587 B2
(45) Date of Patent: *Nov. 5, 2024

(54) REACTION PRODUCTS AND METHODS FOR MAKING AND USING THE SAME

(71) Applicant: KOCH AGRONOMIC SERVICES, LLC, Wichita, KS (US)

(72) Inventors: Kurt D. Gabrielson, Decatur, GA (US); Mary L. Epling, Decatur, GA (US)

(73) Assignee: KOCH AGRONOMIC SERVICES, LLC, Wichita, KS (US)

( * ) Notice: Subject to any disclaimer, the term of this patent is extended or adjusted under 35 U.S.C. 154(b) by 214 days.

This patent is subject to a terminal disclaimer.

(21) Appl. No.: 17/339,200

(22) Filed: Jun. 4, 2021

(65) Prior Publication Data

US 2021/0340074 A1 Nov. 4, 2021

Related U.S. Application Data

(60) Continuation of application No. 15/929,060, filed on Nov. 12, 2018, now Pat. No. 11,028,024, which is a
(Continued)

(51) Int. Cl.
*C05G 3/90* (2020.01)
*C05C 3/00* (2006.01)
(Continued)

(52) U.S. Cl.
CPC .................. *C05G 3/90* (2020.02); *C05C 3/00* (2013.01); *C05C 9/00* (2013.01); *C05C 9/02* (2013.01);
(Continued)

(58) Field of Classification Search
CPC .... C05G 3/90; C05G 5/23; C05C 3/00; C05C 9/00; C05C 9/02; C09K 15/20; Y02P 60/21

See application file for complete search history.

(56) References Cited

U.S. PATENT DOCUMENTS 2,593,911 A 4/1952 Neumann et al.
3,015,649 A 1/1962 Bruno et al.
(Continued)

FOREIGN PATENT DOCUMENTS

CN 1736958 A 2/2006
CN 101817712 B 6/2013
(Continued)

OTHER PUBLICATIONS

European Search Report mailed in EP Application No. 11775668.4, mailed Sep. 29, 2016, 08 Pages.
(Continued)

*Primary Examiner* — Jennifer A Smith

(57) ABSTRACT

Reaction products and methods for making and using the same are provided. The reaction products particularly may include adducts of two or more reactants. The adducts particularly can incorporate a nitrification inhibitor, such as DCD. In particular embodiments, reaction products may be formed from the reaction of formaldehyde, DCD, urea, and an ammonia source. The adducts may be included in agricultural products, including fertilizer compositions and nitrification inhibitor systems. Fertilizer compositions including the adducts can be beneficial for reducing leaching of nitrification inhibitors applied to soil.

8 Claims, 3 Drawing Sheets

Related U.S. Application Data continuation of application No. 15/210,663, filed on Jul. 14, 2016, now Pat. No. 10,239,799, which is a division of application No. 14/853,538, filed on Sep. 14, 2015, now Pat. No. 9,440,890, which is a continuation-in-part of application No. 13/098,272, filed on Apr. 29, 2011, now abandoned.

(60) Provisional application No. 61/329,680, filed on Apr. 30, 2010.

(51) Int. Cl.
    C05C 9/00      (2006.01)
    C05C 9/02      (2006.01)
    C05G 5/23      (2020.01)
    C09K 15/20     (2006.01)

(52) U.S. Cl.
    CPC ............... *C05G 5/23* (2020.02); *C09K 15/20* (2013.01); *Y02P 60/21* (2015.11)

(56) References Cited

U.S. PATENT DOCUMENTS

| | | | |
|---|---|---|---|
| 3,639,646 A | 2/1972 | Borchert et al. | |
| 3,874,990 A | 4/1975 | Surdyk | |
| 3,954,436 A | 5/1976 | Vad et al. | |
| 4,000,184 A | 12/1976 | Kerbeck et al. | |
| 4,176,105 A | 11/1979 | Miedaner | |
| 4,283,219 A | 8/1981 | Wagner et al. | |
| 4,383,077 A | 5/1983 | Bankert | |
| 4,409,015 A | 10/1983 | Grace, Jr. | |
| 4,526,606 A | 7/1985 | Formaini | |
| 4,551,166 A | 11/1985 | Behnke et al. | |
| 4,994,100 A | 2/1991 | Sutton et al. | |
| 5,362,842 A | 11/1994 | Graves | |
| 5,389,716 A | 2/1995 | Graves | |
| 6,306,194 B1 * | 10/2001 | Wertz | C05G 5/20 71/30 |
| 6,576,035 B2 | 6/2003 | Hartmann et al. | |
| 6,632,262 B2 | 10/2003 | Gabrielson | |
| 7,513,928 B2 | 4/2009 | Phillips et al. | |
| 9,440,890 B2 | 9/2016 | Gabrielson et al. | |
| 11,028,024 B2 | 6/2021 | Gabrielson et al. | |
| 2003/0157247 A1 | 8/2003 | Chikami et al. | |
| 2006/0196241 A1 | 9/2006 | Phillips et al. | |
| 2007/0295047 A1 | 12/2007 | Sutton | |
| 2008/0070871 A1 * | 3/2008 | Hucke | C05G 3/90 564/14 |
| 2009/0035384 A1 * | 2/2009 | Lambeth | C08G 12/40 514/772.1 |
| 2010/0206029 A1 * | 8/2010 | Sutton | C05G 3/90 71/21 |
| 2010/0206031 A1 * | 8/2010 | Whitehurst | C05C 9/00 71/30 |
| 2011/0296886 A1 | 12/2011 | Gabrielson | |
| 2015/0101379 A1 | 4/2015 | Gabrielson et al. | |
| 2021/0340074 A1 | 11/2021 | Gabrielson et al. | |

FOREIGN PATENT DOCUMENTS

| | | | | |
|---|---|---|---|---|
| CN | 103351454 A | * | 10/2013 | |
| DE | 2403443 A | * | 7/1975 | ............ C08G 12/04 |
| DE | 145370 A1 | | 12/1980 | |
| JP | 53069163 A | | 6/1978 | |
| JP | 2006089328 A | | 4/2006 | |
| WO | 2005035448 A1 | | 4/2005 | |
| WO | 2005063654 A2 | | 7/2005 | |
| WO | 2010045712 A1 | | 4/2010 | |

OTHER PUBLICATIONS

Examination Report received for Australian Patent Application No. 2011245115, mailed on Mar. 23, 2015, 03 Pages.

Examination Report received for Chile Patent Application No. 3049-2012, mailed on Jan. 17, 2015.

Examination Report received for Chinese Patent Application No. 201180027859.6, mailed on Mar. 24, 2015, 06 Pages(03 Pages of English Translation and 03 Pages of Official notification).

Examination Report received for Chinese Patent Application No. 201180027859.6, mailed on Sep. 25, 2014, 08 Pages (04 Pages of English Translation and 04 Pages of Official notification).

Examination Report received for European Application No. 11775668.4, mailed on Oct. 11, 2018, 07 Pages.

International Preliminary Report on Patentability received for PCT Application No. PCT/US2011/034669, issued on Nov. 10, 2016, 8 pages.

International Search Report and Written Opinion received for PCT Application No. PCT/US2011/034669, mailed on Jul. 7, 2011, 8 pages.

Office Action for Canada Patent Application No. 2798039 mailed on Jun. 22, 2016, 03 Pages.

Office Action for Canada Patent Application No. 2798039, mailed on Nov. 28, 2016, 03 pages.

Office Action for Canada Patent Application No. 2798039, received Sep. 7, 2017, 03 pages.

Office Action for Indian Patent Application No. 3306/KOLNP/2012, mailed on Nov. 30, 2017, 07 Pages.

Office Action for Mexico Patent Application No. Mx/a/2012/012692 mailed on Jul. 26, 2016, 08 Pages. (04 Pages of Official notification and 04 Pages of English Translation).

Office Action received for CN Application No. 201180027859.6, mailed on Nov. 22, 2013, 24 Pages (17 Pages of English Translation and 07 Pages of Official notification).

Search report received for BR application No. 112012027904-1, mailed on Sep. 15, 2020, 7 pages. (3 pages of English translation and 4 pages of official copy).

Non-final office action received for U.S. Appl. No. 17/503,691, mailed on Dec. 12, 2023, 12 pages.

Cas, "Guanidine, N-cyano-, polymer with ammonia and formaldehyde", CAS Registry No. 34728-25-1, CAS Common Chemistry. CAS, a division of the American Chemical Society, Retrieved on Apr. 4, 2024, 1 page.

Final office action received for U.S. Appl. No. 17/503,691, mailed on Apr. 9, 2024, 9 pages.

* cited by examiner

REACTION PRODUCTS AND METHODS FOR MAKING AND USING THE SAME

CROSS-REFERENCES TO RELATED APPLICATIONS

The present application is a continuation of U.S. application Ser. No. 15/929,060, filed on Nov. 12, 2018, which is a continuation U.S. patent application Ser. No. 15/210,663, filed Jul. 14, 2016, which issued as U.S. Pat. No. 10,239,799 on Mar. 26, 2019, which is a divisional of U.S. patent application Ser. No. 14/853,538, filed Sep. 14, 2015, which issued as U.S. Pat. No. 9,440,890 on Sep. 13, 2016, which is a continuation-in-part of U.S. patent application Ser. No. 13/098,272, filed Apr. 29, 2011, now abandoned, which claims the benefit of U.S. Provisional Patent Application No. 61/329,680, filed Apr. 30, 2010, the disclosures of which are incorporated by reference herein.

BACKGROUND OF THE INVENTION

Embodiments described herein generally relate to fertilizers. More particularly, such embodiments relate to reaction products that provide an extended period of nitrification inhibition and methods for making and using the same.

Fertilizers typically include urea, ammonia, ammonium nitrate, or a mixture thereof to provide a source of nitrogen. Nitrogen is a vital nutrient for plant growth. When urea is used as a source of nitrogen in the fertilizer, the urea converts to ammonia as a result of hydrolysis catalyzed by urease, which is an enzyme produced by numerous fungi and bacteria found in the soil. Ammonia rapidly undergoes ionization in the soil to form ammonium. In most soils, the resulting ammonium and the ammonium nitrate, if present, are readily oxidized to nitrate ($NO_3$) via a sequence of bacterial oxidation reactions, which is commonly referred to as "nitrification." Nitrification of the ammonium, however, happens so fast that a large percentage of the nitrogen in the fertilizer is lost before the plants can utilize it.

Nitrogen is also lost from the soil through volatilization to the atmosphere. Nitrate, another source of nitrogen, is typically lost through leaching into the subsoil by rainwater and/or through denitrification, i.e., bacterial conversion of nitrate to elemental nitrogen.

Attempts to reduce such losses of nitrogen have utilized urease inhibitors and/or nitrification inhibitors as additives to the fertilizer. Urease inhibitors are compounds capable of inhibiting the catalytic activity of the urease enzyme on urea in the soil. Nitrification inhibitors are compounds capable of inhibiting the bacterial oxidation of ammonium to nitrate in the soil. Nitrification inhibitors, however, tend to leach into the soil, away from the plant, thus becoming ineffective at inhibiting nitrification where it is needed—near the plant.

There is a need, therefore, for improved fertilizers that provide an extended period of nitrification inhibition and methods for making and using the same. There is also a need for improved products that reduce nitrification in soil and methods for making and using the same.

SUMMARY OF THE INVENTION

The present disclosure provides compositions that are useful in agricultural applications. The compositions can be nitrification inhibitor compositions and/or fertilizer compositions. The compositions can include one or more adducts arising from a reaction of a plurality of materials. In some embodiments, the compositions can include one or more adducts arising from a reaction of formaldehyde, DCD, urea, and an ammonia source. For example, the present compositions can include one or more triazonyl-formaldehyde-DCD adducts, urea-formaldehyde-DCD adducts, DCD-formaldehyde-oligomer adducts, and/or urea-formaldehyde-oligomer adducts. The compositions can be particularly useful for inhibiting nitrification of a nitrogen source in soil.

In some embodiments, the present disclosure may relate to an agricultural composition. Such agricultural composition may, for example, comprise a material selected from the group consisting of urea, DCD, urea-formaldehyde polymer (UFP), ammonia, and combinations thereof, and may further comprise at least one adduct according to the structure of Formula 4

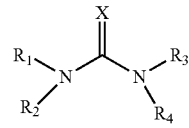

(Formula 4)

wherein: X is O or

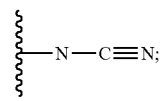

$R_1$, $R_2$, $R_3$, and $R_4$ are independently selected from the group consisting of:

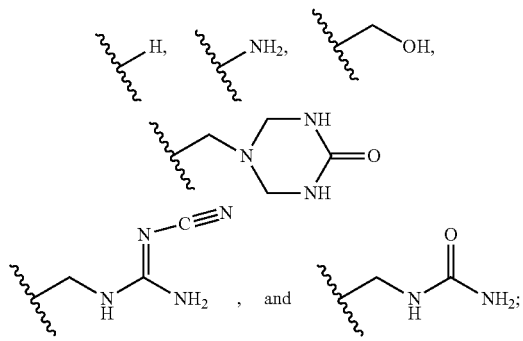

and wherein, if X=O, at least one of $R_1$, $R_2$, $R_3$, and $R_4$ is

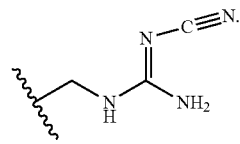 [SMILES: *CN/C(N)=N/C#N]

In some embodiments, a composition according to the present disclosure may specifically include at least one adduct according to the structure of Formula 5, Formula 6, or Formula 7.

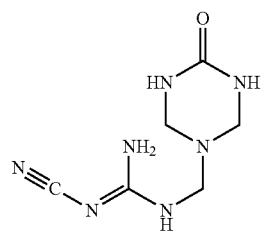

(Formula 5)

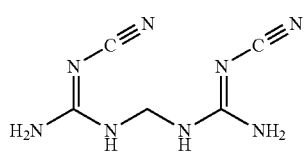

(Formula 6)

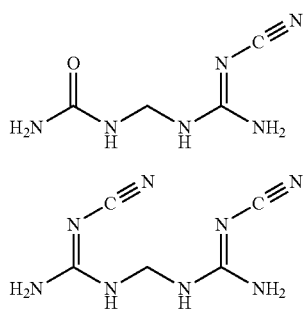

(Formula 7)

In some embodiments, an adduct (for example, an adduct according to the structure of Formula 5, Formula 6, or Formula 7) can be present in a composition at a concentration of about 0.1 to about 10 wt. % based on the total weight of the composition. In certain embodiments, each of the adducts according to Formula 5, Formula 6, and Formula 7 can be present in the composition.

In some embodiments, a composition including an adduct as described herein may be in the form of an aqueous mixture. In particular, such aqueous mixture may have a pH of 7 or greater. In particular embodiments, the aqueous mixture can comprise 2-cyano-1-((4-oxo-1,3,5-triazinan-1-yl)methyl)guanidine, 1-((2-cyanoguanidino)methyl)urea, 2-cyano-1-((2-cyanoguanidino)methyl)guanidine, and DCD. Optionally, the aqueous mixture further can comprise urea. Also optionally, the aqueous mixture further can comprise ammonia.

In some embodiments, the present disclosure may relate to a nitrification inhibitor system. Such system may, for example, comprise a mixture of a triazonyl-formaldehyde-DCD adduct, a urea-formaldehyde-DCD adduct, and a DCD-formaldehyde-oligomer adduct. In further embodiments, the nitrification inhibitor system can comprise about 0.1 to 10 wt. % of the triazonyl-formaldehyde-DCD adduct based upon the weight of the nitrification inhibitor system and/or the nitrification inhibitor system can comprise about 0.1 to 10 wt. % of the urea-formaldehyde-DCD adduct based upon the weight of the nitrification inhibitor system and/or the nitrification inhibitor system can comprise about 0.1 to 10 wt. % of the DCD-formaldehyde-oligomer adduct based upon the weight of the nitrification inhibitor system. In some embodiments, the nitrification inhibitor system further can comprise water and/or free DCD. In particular embodiments, the nitrification inhibitor system can comprise one or more adducts selected from 2-cyano-1-((4-oxo-1,3,5-triazinan-1-yl)methyl)guanidine, 1-((2-cyanoguanidino)methyl)urea, and 2-cyano-1-((2-cyanoguanidino)methyl)guanidine In some embodiments, the present disclosure can relate to a method of preparing a nitrification inhibitor system. Such method may comprise, for example, reacting formaldehyde, DCD, urea, and an ammonia source so as to form an aqueous solution comprising an adduct of DCD. Preferably, the reacting can be carried out at a pH of 7 or greater. Further, the reacting can be carried out such that the adduct of DCD comprises one or more of a triazonyl-formaldehyde-DCD adduct, a urea-formaldehyde-DCD adduct, and a DCD-formaldehyde-oligomer adduct.

In some embodiments, the reacting can comprise reacting formaldehyde with at least a portion of the ammonia source to form a first mixture. The reacting further can comprise reacting the first mixture with the DCD to form a second mixture. The reacting further can comprise reacting the second mixture with urea to form a third mixture. The reacting also can comprise reacting the third mixture with a portion of the ammonia source.

In further embodiments, the present disclosure can provide for reducing nitrification in soil. Such methods can comprise applying an agricultural composition as described herein. Such methods particularly can comprise applying a composition that includes one or more adducts as described herein. In some embodiments, such methods can comprise combining a nitrogen source and the composition prior to applying the composition to the soil. In some embodiments, the methods can comprise applying the composition to the soil in an amount that ranges from about 1 kg/ha to about 50 kg/ha. In some embodiments, a nitrogen source can be applied to the soil prior to applying the composition to the soil. In some embodiments, the composition can be applied to the soil before a nitrogen source is applied to the soil.

DETAILED DESCRIPTION OF THE INVENTION

Figure 1:
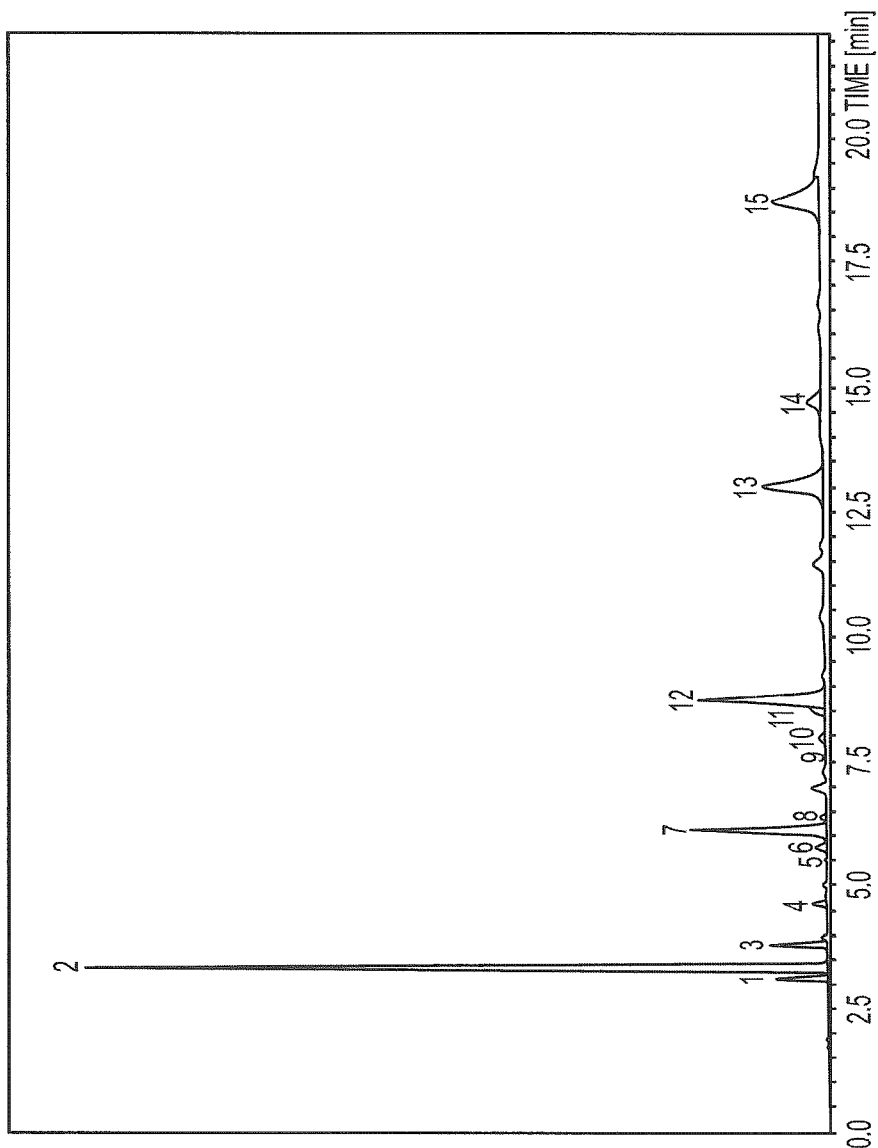
FIG. 1 is a UV (214 nm) chromatogram showing peaks corresponding to different components of a reaction product according to one or more embodiments of the present disclosure.

The present disclosure relates to various reaction products, and particularly relates to products of the reaction of a nitrification inhibitor with one or more further compounds. Such reaction products may be characterized as adducts in that the new compounds arising from the reaction retain two or more of the reactants. In particular, adducts including the nitrification inhibitor used in the reaction are provided herein. In some embodiments, the present disclosure relates to adducts arising from the reaction of a nitrification inhibitor with urea and formaldehyde. In some embodiments, the reaction products can be included in admixture with further compounds. The admixture can include one or more adducts as described herein and a content of one or more of the reactants utilized in forming the adducts. In some embodiments, the adducts can be combined with a fertilizer. As such, the present disclosure can provide one or more adducts, compositions comprising one or more adducts (e.g., aqueous solutions thereof), fertilizer compositions comprising one or more adducts, methods of forming adducts, methods of forming fertilizer compositions comprising one or more adducts, methods of inhibiting nitrification, and methods of reducing leaching of a nitrification inhibitor applied to soil.

In some embodiments, the present disclosure can provide a reaction product of any three or more of the following: formaldehyde, an ammonia source, a nitrification inhibitor, urea, and a urease inhibitor. For example, an adduct provide herein may be a reaction product of formaldehyde, an ammonia source, and a nitrification inhibitor. As another non-limiting example, an adduct provided herein may be a reaction product of formaldehyde, an ammonia source, a nitrification inhibitor, and urea. As a further non-limiting example, an adduct provided herein may be a reaction product of formaldehyde, an ammonia source, a nitrification inhibitor, urea, and a urease inhibitor. As yet a further non-limiting example, an adduct provided herein may be a reaction product of formaldehyde, an ammonia source, a nitrification inhibitor, and a urease inhibitor. As still another non-limiting example, an adduct provided herein may be a reaction product of formaldehyde, an ammonia source, urea, and a urease inhibitor.

Adducts as described herein may be combined with a variety of further materials to form various compositions. For example, a composition may comprise one or more adducts described herein in combination with a nitrogen source. The combination with a nitrogen source may particularly be utilized as a fertilizer composition. As a further example, a composition may comprise one or more adducts as described herein in combination with a urease inhibitor. When combined with a urease inhibitor, the adducts may or may not arise from a reaction wherein a urease inhibitor was also a reactant.

The nitrogen source for use in compositions described herein can include, but is not limited to, urea, ammonium nitrate, anhydrous ammonia, aqueous ammonia, urea-formaldehyde polymers, or any combination thereof. The nitrogen source can be a solid, liquid, gas, or any combination thereof. Illustrative solid nitrogen sources can be in the form of pellets, prills, flakes, granules, and the like. Illustrative liquid nitrogen sources can be aqueous and/or liquid solutions of one or more nitrogen sources. The nitrogen source can be quick release nitrogen, controlled release nitrogen, or a combination thereof. As used herein, the term "quick release nitrogen" refers to free urea, ammonium nitrate, anhydrous ammonia, aqueous ammonia, or any combination thereof. As used herein, the term "controlled release nitrogen" refers to a substituted urea, reacted urea, e.g., urea-formaldehyde polymer, or a combination thereof. The term, "controlled release nitrogen" can also refer to a nitrogen containing material that coverts more slowly than urea in soil to plant available nutrients ammonium and nitrate than a reference quick release nitrogen source. Another suitable nitrogen source can be or include animal waste(s) such as urine and/or manure produced by one or more animals, e.g., cows, sheep, chickens, buffalo, turkeys, goats, pigs, horses, and the like.

As used herein, the term "nitrification inhibitor" refers to any compound(s) that reduces, inhibits, or otherwise slows down the conversion of ammonium ($NH_4^+$) to nitrate in soil when present as compared to the conversion of ammonium ($NH_4^+$) to nitrate in soil when not present. Illustrative nitrification inhibitors can include, but are not limited to, 2-chloro-6-trichloromethyl-pyridine, 5-ethoxy-3-trichloromethyl-1,2,4-thiadiazol, dicyandiamide, 2-amino-4-chloro-6-methyl-pyrimidine, 1,3-benzothiazole-2-thiol, 4-amino-N-1,3-thiazol-2-ylbenzenesulfonamide, thiourea, guanidine, 3,4-dimethylpyrazole phosphate, 2,4-diamino-6-trichloromethyl-5-triazine, polyetherionophores, 4-amino-1,2,4-triazole, 3-mercapto-1,2,4-triazole, potassium azide, carbon bisulfide, sodium trithiocarbonate, ammonium dithiocarbamate, 2,3, dihydro-2,2-dimethyl-7-benzofuranol methyl-carbamate, N-(2,6-dimethylphenyl)-N-(methoxyacetyl)-alanine methyl ester, ammonium thiosulfate, 1-hydroxypyrazole, 2-methylpyrazole-1-carboxamide, derivatives thereof, and any combination thereof. In at least one example, the nitrification inhibitor can be or include dicyandiamide (DCD). For example, 1-hydroxypyrazole can be considered a derivative of 2-methylpyrazole-1-carboxamide and ammonium dithiocarbamate can be considered a derivative of methyl-carbamate.

As used herein, the term "urease inhibitor" refers to any compound(s) that reduces, inhibits, or otherwise slows down the conversion of urea to ammonium ($NH_4^+$) in soil. Illustrative urease inhibitors can include, but are not limited to, N-(n-butyl)thiophosphoric triamide, N-(n-butyl)phosphoric triamide, thiophosphoryl triamide, phenyl phosphorodiamidate, cyclohexyl phosphoric triamide, cyclohexyl thiophosphoric triamide, phosphoric triamide, hydroquinone, p-benzoquinone, hexamidocyclotriphosphazene, thiopyridines, thiopyrimidines, thiopyridine-N-oxides, N,N-dihalo-2-imidazolidinone, N-halo-2-oxazolidinone, derivatives thereof, or any combination thereof. In at least one example, the urease inhibitor can be or include N-(n-butyl)thiophosphoric triamide (NBPT).

The formaldehyde can be used in many forms. For example, paraform (solid, polymerized formaldehyde) and/or formalin solutions (aqueous solutions of formaldehyde, sometimes with methanol, in about 10 wt %, about 20 wt. %, about 37 wt. %, about 44 wt. %, or about 50 wt. %, based on the weight of the formalin solution) are commonly used forms. For example, the formaldehyde can be an aqueous solution having a concentration of formaldehyde ranging from about 10 wt. % to about 50 wt. %, based on a total weight of the aqueous solution. Formaldehyde gas can also be used. Formaldehyde substituted in part or in whole with substituted aldehydes such as acetaldehyde and/or propylaldehyde can be used as the source of formaldehyde. One or more other aldehydes, such as glyoxal can be used in place of or in combination with formaldehyde. Any of these forms of formaldehyde sources can be used alone or in any combination to prepare the reaction product.

The urea can also be used in many forms. For example, the urea can be a solid in the form of prills, flakes, granules, and the like, and/or a solution, such as an aqueous solution. Further, the urea may be combined with another moiety, for example, formaldehyde and/or urea-formaldehyde adducts, often in aqueous solution. As noted above, the nitrogen source can be or include animal waste such as urine and/or manure. As such, at least a portion of the urea, if present, can be in the form of animal waste. Any form of urea or urea in combination with formaldehyde can be used to make a urea-formaldehyde polymer. Both urea prill and combined urea-formaldehyde products can be used. Illustrative urea-formaldehyde products can include, but are not limited to, Urea-Formaldehyde Concentrate ("UFC"). These types of products can be as discussed and described in U.S. Pat. Nos. 5,362,842 and 5,389,716, for example. Any of these urea sources can be used alone or in any combination to prepare the reaction product.

As used herein, the term "ammonia source" refers to ammonia or any ammonium compound(s) that liberate ammonia when reacted with the formaldehyde and the nitrification inhibitor. Illustrative ammonia sources can include, but are not limited to, ammonium salts such as ammonium nitrate, aqueous ammonia or ammonium hydroxide, anhydrous ammonia, or combinations thereof. Suitable aqueous ammonium solutions can have an ammonia concentration of about 28 wt. %, about 30 wt. %, about 32 wt. %, or about 35 wt. %, for example. Other suitable ammonia sources can include, but are not limited to, primary amines or substituted primary amines such as methyl amine, monomethanol amine, amino propanol, or any combination thereof. Difunctional amines such as ethylene diamine or any combination of organic amines provided that one primary amine group is available to form a triazone ring can be used. Another source of ammonia can be in the form of animal waste such as urine and/or manure. Any of these ammonia sources can be used alone or in any combination to prepare the reaction product. And the ammonia source can be used in any form such a liquid, solid, and/or gas. In some embodiments, a specific ammonia source may be expressly excluded according to the present disclosure. For example, as further described herein, an ammonia source may expressly exclude the use of ammonium chloride. Other ammonia sources may be excluded if such ammonia source has a pH in water of less than 7 and/or if such ammonia source provides an undesirable reduction in the pH of a reaction as described herein for forming adducts.

In some embodiments, the present disclosure can relate to adducts formed in the reaction of urea (see Formula 1), formaldehyde (see Formula 2), DCD (see Formula 3), and ammonia ($NH_3$). Such adducts are described herein as being representative of the scope of compounds and compositions encompassed by the present disclosure. It is understood that adducts likewise may be formed utilizing nitrification inhibitors in addition to DCD.

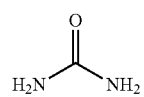
(Formula 1)

(Formula 2)

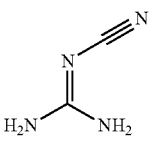
(Formula 3)

Adducts arising from the reaction of urea, formaldehyde, DCD, and ammonia may be encompassed by the structure of Formula 4

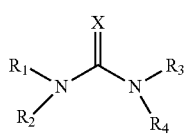
(Formula 4)

wherein:
X is O or

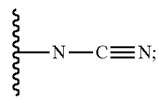

$R_1$, $R_2$, $R_3$, and $R_4$ are independently selected from the group consisting of:

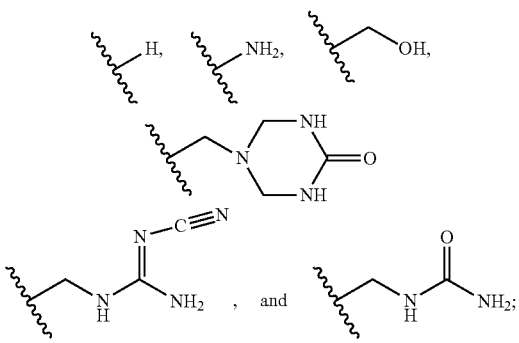

and
wherein, if X=O,
at least one of $R_1$, $R_2$, $R_3$, and $R_4$ is

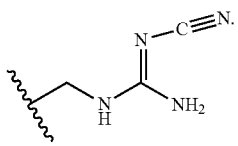 [SMILES: *CN/C(N)=N/C#N]

The reaction of materials as described herein may result in the formation of a plurality of different adducts. For example, a reaction product according to the present disclosure may include at least 1 adduct, at least 2 different adducts, at least 3 different adducts, at least 4 different adducts, at least 5 different adducts, at least 10 different adducts, at least 25 different adducts, at least 50 different adducts, or at least 100 different adducts. The adducts may be in the form of discrete compounds, oligomers, polymers, and combinations thereof. The adducts may have a weight average molecular weight (or molar mass) of about 100 Da or greater. Molar mass of the adducts may be about 100 Da to about 10,000 Da, about 100 Da to about 5,000 Da, about 100 Da to about 1,000 Da, or about 100 Da to about 500 Da. In some embodiments, a set of adducts arising from a single reaction utilizing materials as described herein may include adducts falling within 2 or more, 3 or more, 4 or more, or 5 or more different ranges. For example, molar mass ranges may be characterized as being: between 100 Da and 200 Da; between 200 Da and 300 Da; between 300 Da and 400 Da; between 500 Da and 1,000 Da, between 1,000 Da and 2,000 Da; and 2,000 Da and greater. A set of adducts arising from the reaction of materials as described herein may include adducts with a molar mass falling within at least two of the foregoing ranges, at least three of the foregoing ranges, or at least four of the foregoing ranges.

Beneficially, the nature of the several adducts that may be present in a single set of reaction products may be envisioned based upon the materials utilized in the reaction. For example, in the reaction of urea, formaldehyde, DCD, and ammonia, adducts arising therefrom would be recognizable as falling within the structure of Formula 4 as described above. Substitution of a reactant would be expected to lead to formation of adducts of similar structure but including conserved substituent groups from the substituted reactant. For example, in embodiments wherein DCD may be replaced with a different nitrification inhibitor, formed adducts would be expected to have a group of structures similar to that described by Formula 4, but the active groups from the different nitrification inhibitor would be expected to replace the cyanamide group from the DCD. Thus, the exemplary adducts arising from the reaction of urea, formaldehyde, DCD, and ammonia can provide a basis whereby the adducts formed by the reaction of different materials may be envisioned, particularly in embodiments wherein urea (or a urea source) and formaldehyde are utilized as reactants.

Specific adducts arising from the reaction of the various materials as described herein can be identified by analytical methods, such as high performance liquid chromatography (HPLC), liquid chromatography mass spectrometry (LCMS), and nuclear magnetic resonance (NMR) spectroscopy. The types of adducts arising from a reaction according to the present disclosure can vary based upon the materials utilized in the reaction. For example, in embodiments encompassing the reaction of urea, formaldehyde, DCD, and ammonia, the reaction products may include adducts selected from the group consisting of ureaformaldehyde (UF) oligomer adducts, DCD-formaldehyde oligomer adducts, urea-formaldehyde-DCD adducts, triazonyl-formaldehyde-DCD adducts, and combinations thereof. As non-limiting examples, three specific adducts identified by LCMS arising from the reaction of urea, formaldehyde, DCD, and ammonia are provided in Formula 5 [2-cyano-1-((4-oxo-1,3,5-triazinan-1-yl)methyl)guanidine–molar mass of 197.0], Formula 6 [1-((2-cyanoguanidino)methyl)urea–molar mass 156.0], and Formula 7 [2-cyano-1-((2-cyanoguanidino)methyl)guanidine–molar mass 180.0]. Testing carried out confirming the formation of such reaction products is described in the appended Examples.

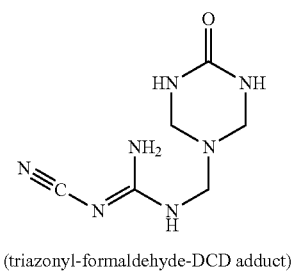

(triazonyl-formaldehyde-DCD adduct) (Formula 5)

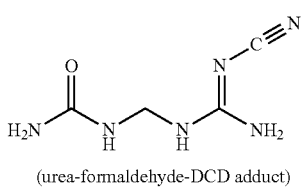

(urea-formaldehyde-DCD adduct) (Formula 6)

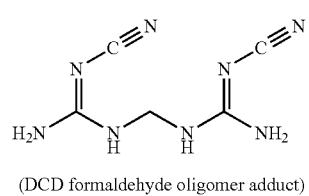

(DCD formaldehyde oligomer adduct) (Formula 7)

In some embodiments, a reaction product according to the present disclosure can include one, two, or all three of the adducts shown in Formulas 5 through 7 in any combination. In particular, a reaction product may include one or more of an adduct having a molecular weight of 197.0 Da, an adduct having a molecular weight of 156.0 Da, and an adduct having a molecular weight of 180.0 Da, such molecular weights being confirmed by mass spectra.

The adducts defined in Formula 5, Formula 6, and Formula 7 are non-limiting examples of reaction products as defined by the class of adducts in Formula 4. Adducts that may be formed according to the present disclosure may include any combination of groups encompassed by $R_1$-$R_4$ in any number.

In some embodiments, the adducts according to this disclosure can have a polymeric backbone defined by Formula 8, wherein z is an integer of 1 or greater, preferably 1 to 100.

(Formula 8)

Adducts having a backbone structure according to Formula 8 can be defined according to the following:
at least one carbon in the backbone is substituted with the group

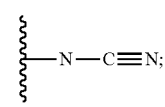

at least one carbon in the backbone is optionally substituted with the group =O; and
each nitrogen in the backbone independently includes a substituent selected from the group consisting of:

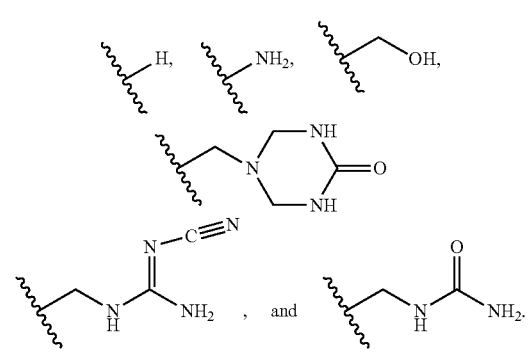

A further, non-limiting example of a urea-formaldehyde-DCD adduct that may arise from the reaction of urea, formaldehyde, DCD, and ammonia is shown in Formula 9. As seen therein, the —N—C—N— backbone is present in the adduct.

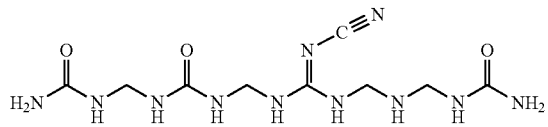

(Formula 9)

Preparation of the Reaction Product

Reactions carried out for production of adducts as described herein can be carried out by reacting a nitrification inhibitor with the further starting components under conditions that preferentially conserves the nitrification inhibitor. Although starting components such as DCD, an ammonia source, and formaldehyde may be reacted under acidic conditions, adducts as described herein would not expected to form under such conditions because of a lack of conservation of the DCD cyanamide group. For example, the reaction of ammonium chloride, formaldehyde, and DCD leads to UF condensation at a pH of approximately 5-5.2 in light of the production of HCl from the reaction of the ammonium chloride and the formaldehyde. Under such conditions, substantially all of the DCD provided as a reactant is converted to a UF-guanidine product due to the cyano functional groups of the DCD being hydrolyzed. As such, the resulting reaction product is substantially lacking in any nitrification inhibiting function because of the absence of unreacted DCD or reaction products incorporating the DCD cyanamide group. Such result would be expected to occur under similar reaction conditions where an acid catalyst (e.g., ammonium chloride) is utilized.

Preferably, adducts according to the present disclosure can be produced under basic or alkaline reaction conditions. For example, adducts can be formed by reacting a nitrification inhibitor, a urea source, formaldehyde, and an ammonia source (preferably one that does not form an acid moiety during the reaction) under basic reaction conditions at a pH of greater than 7. For example, the basic reaction conditions can be at a pH ranging from a low of about 7, about 7.5, about 8, about 8.5, or about 9 to a high of about 9.5, about 10, about 10.5, or about 11.

The reaction product produced under basic reaction conditions can be prepared by combining, mixing, or otherwise contacting the reaction components to produce a reaction mixture having a pH greater than about 7. For example, a reaction mixture of formaldehyde, ammonia, a nitrification inhibitor, and urea under the basic reaction conditions can have a pH ranging from a low of about 8, about 8.5, or about 9 to a high of about 9.5, about 10, about 10.5, or about 11. Similarly, the reaction mixture under the basic reaction conditions can also have a pH ranging from a low of about 8, about 8.5, or about 9 to a high of about 9.5, about 10, about 10.5, or about 11. Heat from the exothermic reaction can be allowed to heat the reaction mixture to a temperature ranging from a low of about 50° C., about 60° C., or about 65° C. to a high of about 80° C., about 90° C., or about 100° C. The reaction mixture can be maintained at an elevated temperature, e.g., about 50° C. to about 90° C. for a time ranging from about 1 minute to about 3 hours. The resulting reaction mixture can then be cooled to, for example, room temperature, to provide the reaction product, which can include one or more adducts as described herein.

In another example, formaldehyde and a first portion of the ammonia source can be combined to form a first mixture. The first mixture can be at least partially reacted, and the formaldehyde and ammonia may be present in the first mixture at a mole ratio of about 40:1, to about 5:1, about 35:1 to about 10:1, or about 30:1 to about 15:1. The nitrification inhibitor can then be added to the first mixture or to the at least partially reacted first mixture to produce a second mixture. The second mixture can be at least partially reacted, and the nitrification inhibitor and formaldehyde can be present in the second mixture at a mole ratio of about 0.01:1 to about 2:1, about 0.05:1 to about 1:1, or about 0.1:1 to about 0.5:1. Urea can then be added to the second mixture or the at least partially reacted second mixture to produce a third mixture. The third mixture can be at least partially reacted, and the urea and formaldehyde can be present in the third mixture at a mole ratio of about 0.1:1 to about 5:1, about 0.25:1 to about 2:1, or about 0.5:1 to about 1:1. A second portion of the ammonia source can be added to the third mixture to produce a fourth mixture. The fourth mixture can be at least partially reacted to produce the reaction product of formaldehyde, urea, ammonia, and the nitrification inhibitor. The temperature of the first mixture, second mixture, and third mixture can be maintained at a temperature ranging from about 25° C. to about 70° C. The temperature of the fourth mixture can range from about 60° C. to about 90° C. and can be held at the increased temperature for a period of time ranging from about 5 minutes to about 3 hours. As a non-limiting example of a reaction product, the mole ratio of formaldehyde:urea:DCD:ammonia in a reaction product according to some embodiments of this disclosure can be about 1:0.88:0.14:0.24.

The addition of the urease inhibitor, if present, can similarly be combined in any order or sequence to produce another reaction mixture or can be combined with the first, second, third, and/or fourth reaction mixture. In another example, the reaction components can be simultaneously combined together to from a single reaction mixture. In yet another example, the formaldehyde, the nitrification inhibitor, and the urea can be combined to provide a first mixture and the ammonia source can then be added to the first mixture to produce a second mixture. The second mixture can then be reacted to produce the reaction product.

Exothermic heat generated from the first mixture, second mixture, third mixture, fourth mixture, or any number of mixtures, can be used, at least in part, as the heat source for heating any one or more of the reaction mixtures. In another example, heat can be introduced to any one or more of the reaction mixtures to provide a heated reaction mixture via a heating coil or other heat exchanging device or system. The temperature of the reaction mixtures can be maintained below a desired maximum temperature, e.g., 100° C., via a cooling coil or other heat exchanging device or system.

One or more bases or base compounds can be added before and/or during the reaction to any one or more of the reaction mixtures and/or the reaction product to maintain and/or adjust the pH thereof. For example, the reaction product produced under basic reaction conditions can be maintained at a pH of about 8 to about 11 during the reaction and/or for the final reaction product. Illustrative base compounds suitable for adjusting the pH of the reaction product can include, but are not limited to, ammonia, amines, e.g., primary, secondary, and tertiary amines and polyamines, sodium hydroxide (NaOH), potassium hydroxide (KOH), or any combination thereof An aqueous base solution can have any concentration. For example, an aqueous base solution of sodium hydroxide, potassium hydroxide, or a combination thereof, having a concentration ranging from a low of about 5 wt. %, about 10 wt. %, or about 15 wt. % to a high of about 25 wt. %, about 50 wt. %, or about 75 wt. % can be introduced to one or more of the reaction mixtures and/or the reaction product in order to adjust and/or maintain the pH between about 8 and about 11.

In another example, one or more pH buffering compounds, which can buffer the pH of the reaction mixture(s) at a desired pH, can be added at the start of the reaction. Illustrative pH buffering compounds can include, but are not limited to, triethanolamine, sodium borate, potassium bicarbonate, sodium carbonate, potassium carbonate, or any combination thereof. In another example the one or more pH buffering compounds can be used in conjunction with one or more base compounds to adjust and/or maintain a desired pH of the reaction mixture(s).

The reaction product produced under the basic reaction conditions can have a pH greater than 7. For example, the reaction product of formaldehyde, the ammonia source, the nitrification inhibitor, and urea produced under the basic reaction conditions can have a pH ranging from a low of about 8, about 8.5, or about 9 to a high of about 9.5, about 10, about 10.5, or about 11.

Additional details for reacting formaldehyde, urea, and an ammonia source under basic conditions are discussed and described in U.S. Pat. Nos. 6,632,262 and 7,513,928 and U.S. Patent Application Publication No. 2006/0196241, the disclosures of which are incorporated herein by reference.

The reaction product produced as described herein can include one or more other additives. For example, ethylene diamine can be added to the reaction product and/or to an intermediate mixture formed during the production thereof. Ethylene diamine can help adjust, control, and/or maintain water solubility of the reaction product. Other chelating agents include ethylenediaminetetraacetic acid (EDTA), diethylenetriaminepentaacetic acid (DPTA), N(hydroxyethyl)ethylenediaminetriacetic acid (HEDTA), nitrilotriacetic acid (NTA), along with a wide range of conjugate bases for the previously listed acids. Suitable commercially available suspension additives can include, for example, K-Tionic, which is manufactured and distributed by GBS Biosciences, LLC.

The reaction product from the reaction of formaldehyde, urea, the ammonia source, and the nitrification inhibitor can include from about 25 mol % to about 65 mol % formaldehyde, from about 10 mol % to about 25 mol % urea, from about 5 mol % to about 25 mol % ammonia, and from about 5 mol % to about 25 mol % nitrification inhibitor, based on the total weight of the formaldehyde, urea, ammonia, and nitrification inhibitor. The formaldehyde can be present in an amount ranging from a low of about 25 mol %, about 30 mol %, or about 35 mol % to a high of about 50 mol %, about 55 mol %, or about 60 mol %, based on the total weight of the formaldehyde, urea, ammonia, and nitrification inhibitor. The urea can be present in an amount ranging from a low of about 12 mol %, about 14 mol %, or about 16 mol % to a high of about 18 mol %, about 22 mol %, or about 25 mol %, based on the total weight of the formaldehyde, urea, ammonia, and nitrification inhibitor. The ammonia can be present in an amount ranging from a low of about 7 mol %, about 9 mol %, or about 12 mol % to a high of about 18 mol %, about 22 mol %, or about 25 mol %, based on the total weight of the formaldehyde, urea, ammonia, and nitrification inhibitor. The nitrification inhibitor can be present in an amount ranging from a low of about 7 mol %, about 9 mol %, or about 12 mol % to a high of about 18 mol %, about 22 mol %, or about 25 mol %, based on the total weight of the formaldehyde, urea, ammonia, and nitrification inhibitor.

The reaction product of formaldehyde, the ammonia source, and the nitrification inhibitor can have a molar ratio of formaldehyde to ammonia ranging from about 1:1 to about 8:1, about 2:1 to about 6:1, about 2.5:1 to about 5:1, about 3:1 to about 4:1, or about 2:1 to about 4:1. The reaction product of formaldehyde, urea, the ammonia source, and the nitrification inhibitor can have a molar ratio of formaldehyde to ammonia ranging from about 1:1 to about 8:1, about 2:1 to about 6:1, about 3:1 to about 5:1, or about 3.5:1 to about 4.5:1. The reaction product of formaldehyde, urea, the ammonia source, the nitrification inhibitor, and the urease inhibitor can have a molar ratio of formaldehyde to ammonia ranging from about 1:1 to about 8:1, about 2:1 to about 6:1, about 3:1 to about 5:1, or about 3.5:1 to about 4.5:1.

The reaction product of formaldehyde, the ammonia source, and the nitrification inhibitor can have a molar ratio of formaldehyde to nitrification inhibitor ranging from about 1:1 to about 7:1, about 1.5:1 to about 6.5:1, about 2:1 to about 6:1, about 2.5:1 to about 5:1, about 2:1 to about 4:1, or about 2.5:1 to about 3.5:1. The reaction product of formaldehyde, urea, the ammonia source, and the nitrification inhibitor can have a molar ratio of formaldehyde to nitrification inhibitor ranging from about 1:1 to about 8:1, about 1:1 to about 7:1, about 2:1 to about 8:1, about 3:1 to about 7.5:1, or about 3.5:1 to about 7:1.

The reaction product of formaldehyde, the ammonia source, the nitrification inhibitor, and the urease inhibitor can have a molar ratio of formaldehyde to nitrification inhibitor ranging from about 1:1 to about 7:1, about 1:1 to about 5:1, about 1.5:1 to about 4:1, about 2:1 to about 4:1, about 2.5:1 to about 3.5:1, or about 2.7:1 to about 3.5:1. The molar ratio of formaldehyde to the urease inhibitor in the reaction product of formaldehyde, the ammonia source, the nitrification inhibitor, and the urease inhibitor can be the same or similar to the molar ratio of formaldehyde to the nitrification inhibitor.

The reaction product of formaldehyde, urea, the ammonia source, and the nitrification inhibitor can have a molar ratio of formaldehyde to urea ranging from about 1:1 to about 4:1, about 1.1:1 to about 3.9:1, about 1:1 to about 2:1, about 1:1 to about 1.5:1, or about 1:1 to about 1.3:1. The reaction product of formaldehyde, urea, the ammonia source, the nitrification inhibitor, and the urease inhibitor can have a molar ratio of formaldehyde to urea ranging from 1:1 to about 4:1, about 1.1:1 to about 3.9:1, about 1:1 to about 2:1, about 1:1 to about 1.5:1, or about 1:1 to about 1.3:1.

The reaction product can be produced by reacting formaldehyde, an ammonia source, and a nitrification inhibitor. In another example, the reaction product can be produced by reacting formaldehyde, urea, an ammonia source, and a nitrification inhibitor. In yet another example, the reaction product can be produced by reacting formaldehyde, an ammonia source, a nitrification inhibitor, and a urease inhibitor. In still another example, the reaction product can be produced by reacting formaldehyde, urea, an ammonia source, a nitrification inhibitor, and a urease inhibitor. In another example, the reaction product can be produced by reacting formaldehyde, an ammonia source, and a nitrification inhibitor mixed with a urease inhibitor. In still another example, the reaction product can be produced by reacting formaldehyde, urea, an ammonia source, and a nitrification inhibitor mixed with a urease inhibitor. In other words, the urease inhibitor can be reacted into the reaction product of formaldehyde, the ammonia source, the nitrification inhibitor, and optionally urea, mixed with the reaction product, or both.

In some embodiments, the present disclosure can relate to a composition that arises from the reaction of urea, formaldehyde, a nitrification inhibitor (e.g., DCD), and ammonia. Such composition may be characterized as a nitrification inhibitor system. The composition can be a mixture of a plurality of materials, including reaction product(s) (i.e., adducts as described herein) and one or more unreacted starting components. The composition particularly may be an aqueous mixture including water. In some embodiments, the composition can comprise one or more adducts as described herein admixed with one or more of: water; free DCD; ammonia, urea-formaldehyde polymer (UFP); and urea.

One or more adducts as described herein or a nitrification inhibitor system including one or more of such adducts can be mixed or otherwise combined with one or more nitrogen sources to provide a fertilizer product. In some embodiments, a reaction mixture arising from the reaction of urea, formaldehyde, ammonia source, and nitrification inhibitor can be used alone as a nitrogen fertilizer product.

The reaction product (i.e., one or more adducts as described herein or a nitrification inhibitor system including one or more of such adducts) can be mixed, blended, or otherwise combined with the one or more nitrogen sources to form the fertilizer. For example, the reaction product can be mixed with the one or more nitrogen sources in a vessel or container to provide the fertilizer. Similarly, the one or more nitrogen sources can be mixed, blended, or otherwise combined with the reaction product to form the fertilizer. For example, the nitrogen source can be mixed with the reaction product in a vessel or container to provide the fertilizer. The amount of the reaction product and the one or more nitrogen sources can vary, and the amount of the reaction product can be measured in terms of the amount of nitrogen contained in the nitrogen source(s). For example, the amount of reaction product in the fertilizer can range from about 0.1 wt. % to about 25 wt. %, based on the total amount of nitrogen in the one or more nitrogen sources in the fertilizer. In another example, the amount of reaction product in the fertilizer can range from a low of about 0.5 wt. %, about 1 wt. %, about 2 wt. %, about 3 wt. %, about 4 wt. %, or about 5 wt. % to a high of about 10 wt. %, about 12 wt. %, about 15 wt. %, about 18 wt. %, about 20 wt. %, or about 25 wt. %, based on the total amount of nitrogen in the one or more nitrogen sources in the fertilizer. In another example, the amount of reaction product in the fertilizer can range from about 0.5 wt. % to about 3 wt. %, about 5 wt. % to about 15 wt. %, about 8 wt. % to about 12 wt. %, or about 10 wt. % to about 20 wt. %, based on the total amount of nitrogen in the one or more nitrogen sources in the fertilizer.

In a specific example, a fertilizer product containing 907 kg (2,000 lbs) of a urea ammonium nitrate solution containing 32 wt. % nitrogen (32% UAN) may contain 2.9 kg (6.4 lbs) or 1 wt. % of the reaction product, based on the total amount of nitrogen in the UAN solution. In another specific example, a fertilizer product containing 1,000 kg (2,200 lbs) of a 32% UAN solution may contain about 32 kg (70.5 lbs) or 10 wt. % of the reaction product, based on the total amount of nitrogen in the UAN solution. In yet another specific example, a fertilizer product containing about 1,000 kg (2,200 lbs) of anhydrous ammonia, which has an 82 wt. % nitrogen content, may contain about 82 kg (181 lbs) or about 10 wt. % of the reaction product, based on the total amount of nitrogen in the anhydrous ammonia.

In another example, the nitrogen source can be mixed with the reaction product within the soil, on or about the surface of the soil, or a combination thereof. For example, the nitrogen source can be or include animal waste such as urine and/or manure deposited on and/or in the soil. In another example, the nitrogen source can be or include a fertilizer product previously applied to the soil. As such, the reaction product can be applied to the soil and mixed with the animal waste and/or previously applied fertilizer(s) on the surface of and/or within the soil. The reaction product can be applied to the soil before, during, and/or after the animal waste and/or fertilizer(s) are deposited on/in the soil. In another example, the nitrogen source can be or include animal waste such as urine and/or manure that can be collected and placed within a holding tank, pond, or the like, and the reaction product can be added to the animal waste to provide a mixture. The mixture can then be deposited about the soil to act as a fertilizer therein.

If the nitrogen source includes animal waste such as urine and/or manure, the amount of the reaction product mixed or otherwise combined with the nitrogen source that includes the animal waste can range from about 0.1 wt. % to about 25 wt. %, based on the total amount of nitrogen in the one or more nitrogen sources. In another example, the amount of reaction product mixed or otherwise combined with the nitrogen source that includes the animal waste can range from a low of about 0.5 wt %, about 1 wt. %, about 2 wt. %, about 3 wt. %, about 4 wt. %, or about 5 wt. % to a high of about 10 wt. %, about 12 wt. %, about 15 wt. %, about 18 wt. %, about 20 wt. %, or about 25 wt. %, based on the total amount of nitrogen in the one or more nitrogen sources in the fertilizer. In another example, the amount of reaction product mixed or otherwise combined with the nitrogen source that includes the animal waste can range from about 0.5 wt. % to about 3 wt. %, about 5 wt. % to about 15 wt. %, about 8 wt. % to about 12 wt. %, or about 10 wt. % to about 20 wt. %, based on the total amount of nitrogen in the one or more nitrogen sources in the fertilizer. In another example, in addition to or in lieu of animal waste as providing the nitrogen source, the nitrogen source can be provided from one or more previous applications of a fertilizer that contained urea, ammonia, ammonium nitrate, or any combination thereof, for example. In other words, the reaction product can be applied to a soil that contains a fertilizer containing urea, ammonia, ammonium nitrate, animal waste(s), or any combination thereof previously applied thereto or a soil to which a fertilizer containing urea, ammonia, ammonium nitrate, animal waste(s), or any combination thereof may be applied thereto.

In another example, the reaction product can be mixed or combined with one or more quick release nitrogen sources and one or more controlled release nitrogen sources to provide the fertilizer. For example, a fertilizer product can include a mixture of the reaction product, a urea-formaldehyde polymer (UFP), and an aqueous solution of urea (U), an aqueous solution of ammonium nitrate (AN), an aqueous solution of urea-ammonium nitrate (UAN), or any combination thereof. For example, the fertilizer product containing both quick release and controlled release nitrogen sources can include the controlled release nitrogen source(s) in an amount ranging from a low of about 10 wt. %, about 20 wt. %, about 30 wt. %, or about 40 wt. % to a high of about 60 wt. %, about 70 wt. %, about 80 wt. %, about 90 wt. %, or about 95 wt. %, based on the total weight of nitrogen in both the controlled release nitrogen source and the quick release nitrogen source. The fertilizer product containing both quick release and controlled release nitrogen sources can have a concentration of the reaction product ranging from about 0.5 wt. % to about 25 wt. %, about 1 wt. % to about 15 wt. %, about 5 wt. % to about 20 wt. %, or about 1 wt. % to about 20 wt. %, based on the total nitrogen in the quick release nitrogen source(s). In another example, the fertilizer product can include an aqueous urea-formaldehyde solution (UF) mixed with a quick release nitrogen source at a weight ratio from about 90:10 to about 10:90, about 80:20 to about 20:80, about 75:25 to about 25:75, or about 30:70 to about 70:30 and the reaction product can be present in an amount ranging from about 1 wt. % to about 20 wt. % based on the total amount of nitrogen in the quick release nitrogen source.

One or more fertilizer nutrient additives can be mixed or combined with the reaction product and/or a reaction product and nitrogen source mixture. Illustrative fertilizer nutrient additives can include, but are not limited to, phosphorous and/or potassium based nutrients. A commercially available fertilizer nutrient can include, for example, K-Fol 0-40-53, which is a solution that contains 40 wt. % phosphate and 53 wt. % potassium, which is manufactured and distributed by GBS Biosciences, LLC.

One or more pesticides, herbicides, fungicides, or any combination thereof, can also be mixed or combined with the reaction product and/or a reaction product and nitrogen source mixture. Suitable pesticides, herbicides, and fungicides are well known.

Depending on the particular composition of the reaction product and/or the particular composition of the fertilizer product containing the reaction product and one or more nitrogen sources application rates to soil can widely vary. For example, a fertilizer product containing the reaction product and one or more nitrogen sources and having a concentration of the reaction product ranging from about 0.5 wt. % to about 25 wt. %, based on the total amount of nitrogen in the one or more nitrogen sources, can be applied to a soil in an amount ranging from a low of about 5 kg/hectare (kg/ha), about 10 kg/ha, about 20 kg/ha, about 30 kg/ha, about 40 kg/ha, or about 50 kg/ha to a high of about 100 kg/ha, about 150 kg/ha, about 200 kg/ha, about 250 kg/ha, about 300 kg/ha, about 350 kg/ha, or about 400 kg/ha. In another example, the reaction product alone can be applied to a soil in an amount ranging from a low of about 1 kg/ha, about 3 kg/ha, about 5 kg/ha, about 7 kg/ha, or about 10 kg/ha to a high of about 30 kg/ha, about 35 kg/ha, about 40 kg/ha, about 45 kg/ha, about 50 kg/ha, about 60 kg/ha, about 70 kg/ha, or about 80 kg/ha. The particular amount of the reaction product, when applied alone to the soil, can be based, at least in part, on the amount of nitrogen within and/or on the soil and/or the amount of nitrogen expected to be deposited on and/or within the soil.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Incubation Tests

Three reaction products (Ex. 1-3) mixed with a urea solution to produce a liquid fertilizer solution were prepared and incubation tests were conducted. A comparative example of a urea only solution, i.e., a urea solution without a reaction product (C1), and a comparative example of a urea solution mixed with dicyandiamide (DCD) (C2) were also prepared and evaluated. For comparative example C2, the urea solution mixed with DCD was not reacted. In other words, the DCD was mixed with the urea solution to provide the fertilizer. A Control was also prepared that consisted of soil, i.e., no nitrogen source nor reaction product was added.

For Ex. 1, the reaction product was prepared according to the following procedure. In a reaction vessel, about 1,640 g of a 50 wt. % solution of formaldehyde was added at room temperature and the temperature was increased to 50° C. with a heating coil. Over a period of about 15 minutes the temperature was reduced to 25° C. (about 1.7° C. per minute) with a cooling coil and 1,150 grams of DCD was added. The temperature was raised to 60° C. and then about 208 g of ammonium chloride was slowly added in small amounts over a period of about 30 minutes. The addition of ammonium chloride caused an exothermic reaction to produce the reaction product. During the addition of the ammonium chloride the temperature of the reaction product was allowed to increase to 80° C. and was held for about 10 minutes at 80° C. and then cooled to room temperature. The final fertilization additive had a pH of 5.1.

For Ex. 2, the reaction product was prepared according to the following procedure. In a reaction vessel, about 1,290 g of a 50 wt. % solution of formaldehyde was added at room temperature and the temperature was increased and maintained between 30° C. and 50° C. A first portion of ammonium hydroxide (60 g) was then added to the reaction vessel and the temperature of the mixture was maintained below 60° C. About 260 g of DCD was then added to the reaction vessel and the temperature of the mixture was adjusted to between 35° C. and 50° C. About 1,378 g urea was then added to the reaction vessel. A second portion of ammonium hydroxide (250 g) was then added to the reaction vessel. The temperature of the reaction mixture was allowed to exothermically increase to about 90° C. for less than 30 minutes and the temperature was reduced to 85° C. and held for 120 minutes. After heating the reaction mixture to 85° C., distillation was started and carried out until 416.1 g of distillate was removed from the reaction mixture. A 25 wt. % solution of sodium hydroxide was added throughout the reaction and distilled as needed to adjust the pH. The pH of the reaction mixture was kept above 8.4 throughout the reaction. After distillation the reaction mixture was cooled down to provide the reaction product for Ex. 2. The reaction product for Ex. 2 had a final pH of 9.12.

For Ex. 3, the reaction product was prepared according to the following procedure. In a reaction vessel, about 555 g of a 50 wt. % solution of formaldehyde was added at room temperature. About 260 g of ammonium hydroxide was then slowly added to the reaction vessel and the temperature was allowed to exothermically increase to 80° C. About 186 g of DCD was then added to the reaction vessel and the temperature of the reaction mixture was maintained at 75° C. for about 20 minutes. The reaction mixture was then cooled to produce the reaction product for Ex. 3. A 25 wt. % solution of sodium hydroxide was added throughout the reaction as needed to adjust the pH. The pH of the reaction mixture was kept above 8.4 throughout the reaction. The reaction product for Ex. 3 had a final pH of 7.81.

Incubation tests were performed using each Example 1-3 to evaluate the nitrogen transformations for each sample. The effect of each reaction product (Ex. 1-3) on the nitrogen concentration in the soil as both ammonium-nitrogen and nitrate-nitrogen were evaluated at three different concentrations of the reaction products. More particularly, the concentration of DCD for a first set of samples was 0.75 wt. % (Table 1), a second set of samples was 1.5 wt. % (Table 2), and a third set of samples was 3 wt. % (Table 3), where the weight percents of the DCD concentration are based on the total weight of nitrogen in the urea solution.

The soil used in the incubation tests was Greenville loamy soil (clay-loam, siliceous, thermic Plinthic Kandiudults). The soil had a pH of 6.76, an ammonium-nitrogen concentration of 1.3 ppm, and a nitrate-nitrogen concentration of 2.4 ppm. The soil had a total nitrogen concentration of 0.062 wt. % prior to adding any of the fertilizer solutions, an organic matter concentration of 1.14 wt. %, a CEC of 16.2 cmol/kg, phosphorus concentration of 3.55 ppm, a sulfur concentration of 3.5 ppm, and a zinc concentration of 0.11 ppm. The phosphorous and sulfur concentrations were determined according to the Bray-1 test. The zinc concentration was determined according to the DTPA (diethylenetriamine-pentaacetic acid) soil test.

Prior to introducing the fertilizer solutions, each soil sample was incubated for 1 week at 24° C. and had an initial moisture at field capacity. As used herein, the term "field capacity," refers to the drained upper limit or moisture content below which there is no free drainage flow. During the one week incubation period the moisture was reduced to about 80%. For each test 50 g of soil was placed into a cup and each cup was covered with a lid having four holes to allow for aeration and to minimize water loss.

Stock solutions containing each example were prepared by adding 2.15 g of urea and the corresponding amount of DCD (C2) or the reaction product (Ex. 1-3) to a 500 mL beaker to provide samples having 0.75 wt. % (Table 1), 1.5 wt. % (Table 2), and 3 wt. % (Table 3) DCD based on the total nitrogen concentration in the urea solution. After adding the urea (C1), urea plus DCD (C2), and urea plus the reaction products (Ex. 1-3), to the beakers, the contents of each beaker were diluted to 500 mL with distilled water to provide a stock solution. For the examples shown in Tables 1-3 below, 5 mL of the corresponding stock solution were introduced via a pipette onto each 50 g soil sample and the cover was placed thereon. The amount of nitrogen contained in each example (Ex. 1-3, C1, and C2) was 10 mg and the nitrogen was in the form of urea. The soil had at least an 80% field moisture capacity for each sample and if needed additional distilled water was used in order to achieve the 80% field moisture capacity.

Soil extractions were made at 1 week intervals to determine the amount of ammonium-nitrogen and nitrate-nitrogen in each example. A total of 10 extractions were performed, namely at time=0 and after the 1$^{st}$ week, 2$^{nd}$ week, 3$^{rd}$ week, 4$^{th}$ week, 5$^{th}$ week, 6$^{th}$ week, 7$^{th}$ week, 8$^{th}$ week, and the 10$^{th}$ week. Extracting the nitrogen from each sample was done by adding 100 mL of a 2M potassium chloride (KCl) solution to each soil sample to be tested. The amount of nitrogen in the form of ammonium ($NH_4^+$) and nitrate ($NO_3^-$) were then determined.

The amount of ammonium was determined using the well-known Berthelot reaction in which ammonia is chlorinated to monochloroamine, which then reacts with salicylate to form 5-aminosalicylate. After oxidation and oxidative coupling, a green color complex was formed which was measured at 660 nm using a spectrophotometer.

The determination of nitrate was determined based on the reduction of nitrate ($NO_3$) to nitrogen dioxide ($NO_2$) by hydrazinium sulfate or cadmium metal. Then nitrite was determined by diazotizing with sulfanilamide and coupling with α-naphthylethylenediamine dihydrochloroide to form a colored azo dye which was measured at 540 nm with a spectrophotometer.

Table 1 shows the results for samples that had 0.75 wt. % DCD (C2 and Ex. 1-3) based on a total weight of nitrogen in the urea solution. Table 2 shows the results for samples that had 1.5 wt. % DCD (C2 and Ex. 1-3) based on a total weight of nitrogen in the urea solution. Finally, Table 3 shows the results for samples that had 3% wt. DCD (C2 and Ex. 1-3) based on a total weight of nitrogen in the urea solution.

TABLE 1

| | | Control | Urea Only (C1) | Urea + DCD (C2) | Ex. 1 | Ex. 2 | Ex. 3 |
|---|---|---|---|---|---|---|---|
| Wk. 0 | Ammonium ($NH4^+$), mg N | 0.16 | 0.39 | 0.38 | 0.37 | 0.43 | 0.35 |
| | Nitrate ($NO_3^-$), mg N | 1.19 | 1.27 | 1.19 | 1.24 | 1.18 | 1.17 |
| Wk. 1 | Ammonium ($NH4^+$), mg N | 0.13 | 6.81 | 8.08 | 7.40 | 7.65 | 8.07 |
| | Nitrate ($NO_3^-$), mg N | 1.22 | 3.61 | 2.39 | 3.22 | 2.89 | 2.36 |
| Wk. 2 | Ammonium ($NH4^+$), mg N | 0.02 | 4.21 | 6.95 | 5.21 | 5.55 | 6.42 |
| | Nitrate ($NO_3^-$), mg N | 1.27 | 6.37 | 3.50 | 5.35 | 5.08 | 4.02 |
| Wk. 3 | Ammonium ($NH4^+$), mg N | 0.01 | 2.14 | 5.68 | 2.90 | 3.95 | 4.33 |
| | Nitrate ($NO_3^-$), mg N | 1.26 | 8.38 | 4.73 | 7.67 | 6.39 | 6.01 |
| Wk. 4 | Ammonium ($NH4^+$), mg N | 0.01 | 0.18 | 4.73 | 1.90 | 3.08 | 3.42 |
| | Nitrate ($NO_3^-$), mg N | 1.30 | 10.45 | 5.60 | 8.64 | 7.37 | 6.98 |
| Wk. 5 | Ammonium ($NH4^+$), mg N | 0.07 | 0.08 | 1.68 | 0.43 | 1.37 | 1.43 |
| | Nitrate ($NO_3^-$), mg N | 1.35 | 10.69 | 8.92 | 10.25 | 9.40 | 9.14 |
| Wk. 6 | Ammonium ($NH4^+$), mg N | 0.08 | 0.08 | 0.12 | 0.09 | 0.11 | 0.09 |
| | Nitrate ($NO_3^-$), mg N | 1.48 | 10.66 | 10.50 | 10.69 | 10.93 | 10.77 |
| Wk. 7 | Ammonium ($NH4^+$), mg N | 0.09 | 0.09 | 0.11 | 0.11 | 0.10 | 0.11 |
| | Nitrate ($NO_3^-$), mg N | 1.31 | 10.85 | 10.46 | 10.66 | 10.67 | 10.72 |
| Wk. 8 | Ammonium ($NH4^+$), mg N | 0.09 | 0.10 | 0.11 | 0.09 | 0.08 | 0.09 |
| | Nitrate ($NO_3^-$), mg N | 1.40 | 10.97 | 10.76 | 10.88 | 10.98 | 10.73 |
| Wk. 10 | Ammonium ($NH4^+$), mg N | 0.03 | 0.04 | 0.06 | 0.05 | 0.05 | 0.05 |
| | Nitrate ($NO_3^-$), mg N | 1.46 | 10.98 | 10.86 | 10.84 | 11.22 | 10.82 |

As shown in Table 1, the urea and reaction product solutions (Ex. 1-3) having a nitrification inhibitor (DCD) concentration of 0.75 wt. % based on the amount of nitrogen in the urea performed substantially better than the urea only solution (C1) and similarly to the urea+DCD solution (C2). For all the Examples 1-3 the amount of nitrogen in the form of ammonium ($NH_4^+$) was substantially increased as compared to the urea only solution (C1) for weeks 3 through 5. At about the 6th week the ammonium ($NH_4^+$) concentration for all examples dropped off. Similarly, for all the Examples 1-3 the amount of nitrogen in the form of nitrate ($NO_3^-$) was substantially less than the urea only solution (C1) for weeks 3 through 5. At about the 6th week the nitrate ($NO_3^-$) concentration leveled off. The nitrification inhibition exhibited by Ex. 1-3 performed similarly to the urea+DCD solution (C2) in inhibiting the nitrification process.

TABLE 2

1.5 wt. % DCD Based on the Weight of Nitrogen in the Fertilizer

| | | Control | Urea Only (C1) | Urea + DCD (C2) | Ex. 1 | Ex. 2 | Ex. 3 |
|---|---|---|---|---|---|---|---|
| Wk. 0 | Ammonium (NH4+), mg N | 0.16 | 0.39 | 0.38 | 0.28 | 0.27 | 0.36 |
| | Nitrate (NO$_3^-$), mg N | 1.19 | 1.27 | 1.20 | 1.18 | 1.24 | 1.28 |
| Wk. 1 | Ammonium (NH4+), mg N | 0.13 | 6.81 | 8.69 | 7.51 | 8.60 | 8.55 |
| | Nitrate (NO$_3^-$), mg N | 1.22 | 3.61 | 1.86 | 2.76 | 2.17 | 1.91 |
| Wk. 2 | Ammonium (NH4+), mg N | 0.02 | 4.21 | 7.97 | 5.42 | 7.08 | 7.80 |
| | Nitrate (NO$_3^-$), mg N | 1.27 | 6.37 | 2.44 | 5.03 | 3.40 | 2.50 |
| Wk. 3 | Ammonium (NH4+), mg N | 0.01 | 2.14 | 7.20 | 3.99 | 6.20 | 6.91 |
| | Nitrate (NO$_3^-$), mg N | 1.26 | 8.38 | 3.19 | 6.28 | 4.31 | 3.41 |
| Wk. 4 | Ammonium (NH4+), mg N | 0.01 | 0.18 | 6.29 | 2.55 | 4.43 | 5.42 |
| | Nitrate (NO$_3^-$), mg N | 1.30 | 10.45 | 3.95 | 7.86 | 5.93 | 4.82 |
| Wk. 5 | Ammonium (NH4+), mg N | 0.07 | 0.08 | 4.23 | 1.46 | 3.67 | 3.61 |
| | Nitrate (NO$_3^-$), mg N | 1.35 | 10.69 | 6.20 | 9.02 | 6.95 | 6.92 |
| Wk. 6 | Ammonium (NH4+), mg N | 0.08 | 0.08 | 1.24 | 0.10 | 0.54 | 0.96 |
| | Nitrate (NO$_3^-$), mg N | 1.48 | 10.66 | 9.10 | 10.61 | 10.15 | 9.25 |
| Wk. 7 | Ammonium (NH4+), mg N | 0.09 | 0.09 | 0.51 | 0.11 | 0.11 | 0.11 |
| | Nitrate (NO$_3^-$), mg N | 1.31 | 10.85 | 10.02 | 10.54 | 10.94 | 10.25 |
| Wk. 8 | Ammonium (NH4+), mg N | 0.09 | 0.10 | 0.11 | 0.09 | 0.08 | 0.08 |
| | Nitrate (NO$_3^-$), mg N | 1.40 | 10.97 | 10.68 | 10.92 | 11.01 | 10.50 |
| Wk. 10 | Ammonium (NH4+), mg N | 0.03 | 0.04 | 0.05 | 0.04 | 0.04 | 0.04 |
| | Nitrate (NO$_3^-$), mg N | 1.46 | 10.98 | 10.63 | 10.74 | 10.85 | 10.61 |

As shown in Table 2, the urea and reaction product solutions (Ex. 1-3) having a nitrification inhibitor (DCD) concentration of 1.5 wt. % based on the total amount of nitrogen in the urea solution performed substantially better than the urea only solution (C1) and similarly to the urea+DCD solution (C2). For all the Examples 1-3 the amount of nitrogen in the form of ammonium ($NH_4^+$) was substantially greater than the urea only solution (C1) for weeks 3 through 5. Ex. 2 and Ex. 3 showed a substantial increase in the amount of nitrogen present in the form of ammonium ($NH_4^+$) through the 6th week. Similarly, for all the Examples 1-3 the amount of nitrogen in the form of nitrate ($NO_3^-$) was substantially less than the urea only solution (C1) for weeks 3 through 5. Ex. 2 and Ex. 3 continued to show a substantial reduction in the concentration of nitrogen in the form of nitrate ($NO_3^-$) through the 6th week. The nitrification inhibition exhibited by Ex. 1-3 (especially Ex. 2 and 3) performed similarly to the urea+DCD solution (C2) in inhibiting the nitrification process.

As shown in Table 3, the urea and reaction product solutions (Ex. 1-3) having a nitrification inhibitor (DCD) concentration of 3 wt. % based on the total amount of nitrogen in the urea solution performed substantially better than the urea only solution (C1) and similarly to the urea+DCD solution (C2). For all the Examples 1-3 the amount of nitrogen in the form of ammonium ($NH_4^+$) was substantially greater than the urea only solution (C1) for weeks 1 through 6. Ex. 2 showed a substantial increase in the amount of nitrogen present in the form of ammonium ($NH_4^+$) through the 8$^{th}$ week. Similarly, for all the Examples 1-3 the amount of nitrogen in the form of nitrate ($NO_3^-$) was substantially less than the urea only solution (C1) for weeks 1 through 6. The nitrification inhibition exhibited by Ex. 1-3 (especially Ex. 2 and 3) performed similarly to the urea+DCD solution (C2) in inhibiting the nitrification process.

It has been surprisingly and unexpectedly discovered that a reaction product of the nitrification inhibitor with formal-

TABLE 3

3 wt. % DCD Based on the Weight of Nitrogen in the Fertilizer

| | | Control | Urea Only (C1) | Urea + DCD (C2) | Ex. 1 | Ex. 2 | Ex. 3 |
|---|---|---|---|---|---|---|---|
| Wk. 0 | Ammonium (NH4+), mg N | 0.16 | 0.39 | 0.29 | 0.34 | 0.35 | 0.40 |
| | Nitrate (NO$_3^-$), mg N | 1.19 | 1.27 | 1.17 | 1.15 | 1.19 | 1.12 |
| Wk. 1 | Ammonium (NH4+), mg N | 0.13 | 6.81 | 8.74 | 8.06 | 9.05 | 9.01 |
| | Nitrate (NO$_3^-$), mg N | 1.22 | 3.61 | 1.60 | 2.26 | 2.28 | 1.64 |
| Wk. 2 | Ammonium (NH4+), mg N | 0.02 | 4.21 | 8.20 | 7.13 | 8.55 | 8.28 |
| | Nitrate (NO$_3^-$), mg N | 1.27 | 6.37 | 2.07 | 3.35 | 2.36 | 2.27 |
| Wk. 3 | Ammonium (NH4+), mg N | 0.01 | 2.14 | 7.53 | 6.36 | 7.80 | 7.63 |
| | Nitrate (NO$_3^-$), mg N | 1.26 | 8.38 | 2.78 | 4.07 | 3.10 | 2.96 |
| Wk. 4 | Ammonium (NH4+), mg N | 0.01 | 0.18 | 6.05 | 4.08 | 6.20 | 5.83 |
| | Nitrate (NO$_3^-$), mg N | 1.30 | 10.45 | 4.10 | 6.22 | 4.56 | 4.49 |
| Wk. 5 | Ammonium (NH4+), mg N | 0.07 | 0.08 | 5.10 | 2.81 | 5.21 | 4.37 |
| | Nitrate (NO$_3^-$), mg N | 1.35 | 10.69 | 5.18 | 7.76 | 5.86 | 6.14 |
| Wk. 6 | Ammonium (NH4+), mg N | 0.08 | 0.08 | 1.82 | 0.78 | 2.63 | 1.89 |
| | Nitrate (NO$_3^-$), mg N | 1.48 | 10.66 | 8.40 | 9.74 | 8.38 | 8.66 |
| Wk. 7 | Ammonium (NH4+), mg N | 0.09 | 0.09 | 0.61 | 0.11 | 0.41 | 0.12 |
| | Nitrate (NO$_3^-$), mg N | 1.31 | 10.85 | 9.58 | 10.48 | 10.74 | 10.55 |
| Wk. 8 | Ammonium (NH4+), mg N | 0.09 | 0.10 | 0.20 | 0.09 | 0.41 | 0.11 |
| | Nitrate (NO$_3^-$), mg N | 1.40 | 10.97 | 10.35 | 10.73 | 10.91 | 10.74 |
| Wk. 10 | Ammonium (NH4+), mg N | 0.03 | 0.04 | 0.05 | 0.04 | 0.04 | 0.04 |
| | Nitrate (NO$_3^-$), mg N | 1.46 | 10.98 | 10.66 | 10.85 | 11.35 | 10.88 | dehyde and an ammonia source (Ex. 1 and Ex. 3) and a reaction product of the nitrification inhibitor with formaldehyde, urea, and an ammonia source (Ex. 2) reduces the rate at which nitrification of the nitrogen in the fertilizer occurs. As shown in Tables 1-3, the reaction products of Examples 1-3 showed a substantial decrease in the rate at which nitrification occurred in the urea only solution (C1) and performed similarly to the urea+DCD solution (C2).

Leaching Tests

One reaction product (Ex. 4) mixed with a urea solution to produce a liquid fertilizer solution was prepared and leaching tests were conducted. In addition to Ex. 4, two comparative examples (C3 and C4) were also prepared. Comparative example C3 was a mixture of urea and DCD. Comparative example C4 was a mixture of urea ammonium nitrate (UAN), DCD, and a urea-formaldehyde polymer (UFP).

The reaction product used to produce the liquid fertilizer solution of Ex. 4 was the same reaction product used in Ex. 2. For Ex. 4 and C3, a stock urea solution was prepared by dissolving 152.6 g urea in distilled water and diluting to 1 L. 50 mL of the stock urea solution was then added to each of two 500 mL volumetric flasks. To prepare the fertilizer solution of Ex. 4, about 1,008.9 mg of the reaction product of Ex. 4 was added to the first volumetric flask and distilled water was added to bring the volume to 500 mL. To prepare the fertilizer solution of comparative example C3, about 106.2 mg of DCD was added to the second volumetric flask and distilled water was added to bring the volume to 500 mL.

The urea-formaldehyde polymer (UFP) of comparative example C4 was prepared according to the following procedure. In a reaction vessel, about 1,884 g of a 50% solution of formaldehyde was added at room temperature and the temperature was increased and maintained between about 30° C. and about 50° C. A first portion of ammonium hydroxide (about 70 g) was then added to the reaction vessel and the temperature of the mixture was maintained below about 60° C. About 942 grams of urea was then added to the reaction vessel and the temperature of the mixture was adjusted to between about 35° C. and about 50° C. A second portion of ammonium hydroxide (about 403 g) was then added to the reaction vessel. The temperature of the reaction mixture was allowed to exothermically increase to about 90° C. for less than 30 minutes and the temperature was reduced to about 85° C. and held for about 120 minutes during which time distillation was started and carried out until about 921 g of distillate was removed form the reaction mixture. A 25 wt. % solution of sodium hydroxide was added throughout the reaction and distillation as needed in order to maintain the pH of the reaction mixture above about 8.4 throughout the reaction. After distillation, the reaction mixture was cooled down to provide a reaction product of the urea-formaldehyde polymer (UFP), which had a final pH of about 10.2 and a nitrogen concentration of about 22 wt. % based on the weight of the reaction product.

A urea-formaldehyde polymer/urea ammonium nitrate (UFP/UAN) solution was prepared by blending about 73.3 g of urea ammonium nitrate (UAN) having a nitrogen concentration of about 32 wt. % with about 26.7 g of the urea-formaldehyde polymer (UFP) to produce an 80:20 blend where about 80% of the nitrogen was in the UAN and about 20% of the nitrogen was in from the UFP.

A final solution containing DCD and the UFP/UAN solution was then prepared. About 12.2 g of the UAN/UFP solution (about 29.1% N) was then added to a 500 mL volumetric flask along with about 106.2 mg of DCD. The flask was filled to 500 mL using distilled water. This UAN/UFP/DCD solution was used as the fertilizer of comparative example C4.

Table 4 below summarizes the amount of each nitrification inhibitor included in Ex. 4, C3, and C4.

TABLE 4

Nitrification Inhibitor Amounts

| Example | Percent Inhibitor (wt. % Inhibitor/wt. % Nitrogen) | Amount Inhibitor added to 500 mL Flasks (mg) | Amount applied per column in 50 mL (mg Inhibitor) | Total Amount of DCD (mg) |
|---|---|---|---|---|
| Ex. 4 | 28.5 | 1,008.9 | 100.9 | 10.6 |
| C3 | 3.0 | 106.2 | 10.6 | 10.6 |
| C4 | 3.0 | 106.2 | 10.6 | 10.6 |

The leaching tests were conducted on two types of soil and each example (Ex. 4, C3, and C4) was replicated 3 times. As such, the total number of leaching columns was equal to 3 nitrogen sources×2 types of soil×3 replicates for a total of 18 leaching columns.

The first type of soil used in the leaching tests was Greenville clay loam soil (a fine, kaolinitic, thermic Rhodic Kandiudults) having the following properties: a soil pH of about 6.82, an ammonium-N concentration of about 6.3 ppm, a nitrate-N concentration of about 3.1 ppm, 0.060 wt. % total nitrogen, 1.14 wt. % organic matter, a cation exchange capacity (CEC) of about 16.2 cmol kg$^{-1}$, a phosphorous concentration (Bray-1 P) of 3.55 ppm, a sulfur concentration of 3.5 ppm, and a diethylenetriaminepentaacetic acid-extractable zinc concentration (DTPA-Zn) of 0.11 ppm. The Greenville soil has optimum pH for nitrification, moderate texture and a low enough N content to show the effect of added N fertilizer.

The second type of soil used in the leaching tests was Tifton sandy loam soil (a fine-loamy, siliceous, thermic Plinthic Kandiudults) having the following properties; a soil pH of about 4.90, about 1.15 wt. % organic matter, an ammonium-N concentration of about 4.1 ppm, a nitrate-N concentration of about 9.0 ppm, about 0.038 wt. % total nitrogen, a CEC of about 1.8 cmol kg$^{-1}$, and about 79 wt. % sand.

The leaching columns had an inner diameter of 15 cm, a height of 30 cm, and were kept at room temperature, i.e., between about 20° C. and 24° C. Each leaching column had the bottom 5 cm filled with about 800 g of acid-washed sand and the rest of the column was uniformly filled with about 6 kg of the appropriate soil. The sand was washed with 1 M HCl, rinsed with de-ionized water, and spread out to dry before being put in the leaching columns.

The duration of the experiment was 10 weeks (2 weeks before fertilizer application plus a 7 week period of water addition plus final week of drying cycle). The soil used in the leaching columns had a soil moisture content at 50% of field capacity for three weeks before the start of the experiment, i.e., before loading into the leaching columns. The two types of soil differed in field capacity moisture content—the Greenville soil had a field capacity moisture content of 24.5% and the Tifton soil had field capacity moisture content of 11.52%.

The total amount of nitrogen (N) applied as either urea or UAN+UFP to the soil in the leaching columns was equal to about 200 kg N/ha or about 354 mg N/leaching column. In other words, the total amount of nitrogen (N) applied to each leaching column was equal to about 354 mg.

After application of the fertilizer/inhibitor (Ex. 4, C3, and C4), the leaching columns were maintained at about 80-90% field capacity moisture content for the first four days. On the fifth through the seventh days (days 5-7), each leaching column received 14 mm per day water (250 mL per day) delivered uniformly over the soil surface. The three days of water addition were followed by two dry days (days 8-9) to ensure soil moisture in none of the leaching columns exceeded field capacity for a prolonged period of time. The three-day watering followed by two dry day cycles was repeated up to day 20. From then on a three-day watering followed by four dry days was followed until the last water application on day 50. The last drying continued to the termination of the experiment (on day 57).

Leachate from the Greenville clay loam soil was analyzed for DCD about every two days. Table 5 shows the Mean Daily DCD concentration (ppm), Quantity Leached (mg DCD per day), DCD Recovery (percent of DCD added to soil that was recovered in the leachate), and DCD in the Soil (percent of DCD that was not leached from the soil) for the Greenville clay loam soil.

TABLE 5

DCD Analysis Results-Greenville Clay Loam Soil

| Example | DCD Mean Daily Leach (ppm) | DCD Mean Daily Leach (mg) | DCD Recovered in Leachate (%) | DCD that Remained in Soil (%) |
|---|---|---|---|---|
| Ex. 4 | 1.9 | 0.0067 | 15.4 | 84.6 |
| C3 | 3.23 | 0.2830 | 61.4 | 38.6 |
| C4 | 3.16 | 0.2760 | 59.8 | 40.2 |

As shown in Table 5, the fertilizer of Ex. 4, i.e., the mixture of urea and the reaction product surprisingly and unexpectedly substantially outperformed both the urea/DCD solution (C3) and the UAN/UFP/DCD solution (C4) for inhibiting leaching of the DCD. The total DCD leaching loss for the urea and reaction product solution (Ex. 4) was 42 times lower than the urea/DCD solution (C3) and 41 times lower than the UAN/UFP/DCD solution (C4). Said another way, the urea and reaction product solution (Ex. 4) maintained 84.6% of the DCD applied to the soil within the soil, while only 15.4% of the DCD leached out of the soil. In contrast, the comparative examples C3 and C4 maintained only about 38.6% and about 40.2% of the DCD applied to the soil within the soil. Accordingly, Table 5 clearly shows that Ex. 4 performed substantially superior to both comparative examples (C3 and C4) that had about 61.4% and about 59.8% of the DCD applied to the soil, respectively, leached therefrom.

Leachate from the Tifton sandy loam soil was also analyzed for DCD about every two days. Table 6 shows the Mean Daily DCD concentration (ppm), Quantity Leached (mg DCD per day), DCD Recovery (percent of DCD added to soil that was recovered in the leachate), and DCD in the Soil (percent of DCD that was not leached from the soil) for the Tifton sandy loam soil.

TABLE 6

DCD Analysis Results-Tifton Sandy Loam Soil

| Example | DCD Mean Daily Leach (ppm) | DCD Mean Daily Leach (mg) | DCD Recovered in Leachate (%) | DCD that Remained in Soil (%) |
|---|---|---|---|---|
| Ex. 4 | 1.94 | 0.0075 | 17.1 | 82.9 |
| C3 | 3.11 | 0.2750 | 59.7 | 40.3 |
| C4 | 3.34 | 0.3090 | 67.1 | 32.9 |

As shown in Table 6, the fertilizer of Ex. 4, i.e., the mixture of urea and the reaction product surprisingly and unexpectedly substantially outperformed both the urea/DCD solution (C3) and the UAN/UFP/DCD solution (C4) for inhibiting leaching of the DCD. The total DCD leaching loss for the urea and reaction product solution (Ex. 4) was about 37 times lower than the urea/DCD solution (C3) and about 41 times lower than the UAN/UFP/DCD solution (C4). Said another way, the urea and reaction product solution (Ex. 4) maintained about 82.9% of the DCD applied to the soil within the soil, while only about 17.1% of the DCD leached out of the soil. In contrast, the comparative examples C3 and C4 maintained only about 40.3% and about 32.9% of the DCD applied to the soil within the soil. Accordingly, Table 6 clearly shows that Ex. 4 performed substantially superior to both comparative examples (C3 and C4) that had about 59.7% and about 67.1% of the DCD applied to the soil, respectively, leached therefrom.

Not wishing to be bound by theory, it is believed that the reaction products produced by reacting the nitrification inhibitor with formaldehyde and an ammonia source (Ex. 1 and Ex. 3) or with formaldehyde, urea, and an ammonia source (Ex. 2) and (Ex. 4) will exhibit superior nitrification inhibition in real world applications as compared to the nitrification inhibitor applied alone or simply mixed with urea (U), ammonium nitrate (AN), and/or urea ammonium nitrate (UAN) because leaching of the nitrification inhibitor into the surrounding soil and away from the nitrogen source in the fertilizer should be reduced or prevented. In other words, reacting the nitrification inhibitor into a polymer should hold or maintain the presence of the nitrification inhibitor at the point of application, i.e., at the roots of the plant, where the fertilizer, e.g., urea, ammonium nitrate, or a mixture of urea and ammonium nitrate, is present, thus providing an improved nitrification inhibitor. As such, the nitrification inhibitor can more effectively inhibit the loss of nitrogen from a nitrogen source through the process of nitrification because tendency for the nitrification inhibitor to leach into the soil and away from the fertilizer is reduced or inhibited.

Additionally, as shown in comparative example C4, simply mixing the nitrification inhibitor (DCD) with a urea-formaldehyde polymer instead of reacting the nitrification inhibitor into the urea formaldehyde polymer (Ex. 1-4) did not decrease the amount of nitrification inhibitor leached from the soil. Indeed, there is no statistical difference between the two comparatives C3 and C4. Accordingly, incorporating the nitrification inhibitor into the reaction product can more effectively inhibit the loss of nitrogen from a nitrogen source through the process of nitrification because tendency for the nitrification inhibitor to leach into the soil and away from the fertilizer is reduced or inhibited.

Also, not wishing to be bound by theory, it is believed that applying a reaction product produced by reacting formaldehyde, an ammonia source, and a nitrification inhibitor, and optionally urea and/or a urease inhibitor to soil or other substrates that already contains or may be expected to contain one or more nitrogen sources can reduce or prevent the loss of at least one of the one or more nitrogen sources through the process of nitrification because the tendency for the nitrification inhibitor to leach into the soil and away from the fertilizer is reduced or inhibited. As such, the reaction product can be applied to a soil that contains or may be expected to contain nitrogen sources such as those introduced to soil from one or more animals via manure and/or urine and/or previous fertilizer applications and the loss of the nitrogen source(s) through nitrification can be reduced or prevented.

Structural Analysis of Reaction Products

Reaction product compositions were prepared via a basic reaction as described herein using formaldehyde, DCD, urea, and ammonia as reactants. The reaction product compositions were subjected to LCMS spectral analysis along with a comparative sample of NITAMIN® 30 L, which is urea-formaldehyde fertilizer composition of known composition. The spectral graphs were obtained using an Agilent 6330 Ion Trap LCMS with a Grace Adsorbosphere $NH_2$ 3 μm 150 mm×4.6 mm column and a 214 nm UV detector. Samples consisted of approximately 0.03 grams of reaction product in 10 mL of 90:10 acetonitrile/water. A sample injection volume of 24 was used with the device operating with a flow rate of 1.0 mL/min at a temperature of 30° C. Sample run time was 25 minutes. The mobile phase was a mixture of 95% acetonitrile and 5% water by weight. An isocratic aqueous normal phase separation was performed using an $NH_2$ end-capped stationary phase.

Analysis confirmed the presence of a plurality of reaction products including adducts as described herein. Fifteen peaks corresponding to different components in the reaction product were selected from the resulting UV and total ion chromatograms. The UV (214 nm) chromatogram showing the fifteen peaks is provided in FIG. 1, and peak identification is provided in Table 7 (wherein M represents the separate identified compounds).

TABLE 7

LCMS Spectral Peak Identification

| Peak Number | Compound Identity of Ionized Mass (±0.2 Da) |
|---|---|
| 1 | M + $Na^+$ = 148.0 Da |
| 2 | DCD |
| 3 | Urea |
| 4 | M + $Na^+$ = 220.0 Da |
| 5 | Unknown/Appears in NITAMIN ® 30 L |
| 6 | Unknown/Appears in NITAMIN ® 30 L |
| 7 | M + $Na^+$ = 179.0 Da |
| 8 | M + $Na^+$ = 251.1 Da |
| 9 | M + $Na^+$ = 261.1 Da |
| 10 | M + $Na^+$ = 244.1 Da |
| 11 | M + $Na^+$ = 155.0 Da Appears in NITAMIN ® 30 L |
| 12 | M + $Na^+$ = 220.0 Da |
| 13 | M + $Na^+$ = 292.1 Da |
| 14 | M + $Na^+$ = 220.0 Da |
| 15 | M + $Na^+$ = 196.0 Da Appears in NITAMIN ® 30 L |

Figure 2:
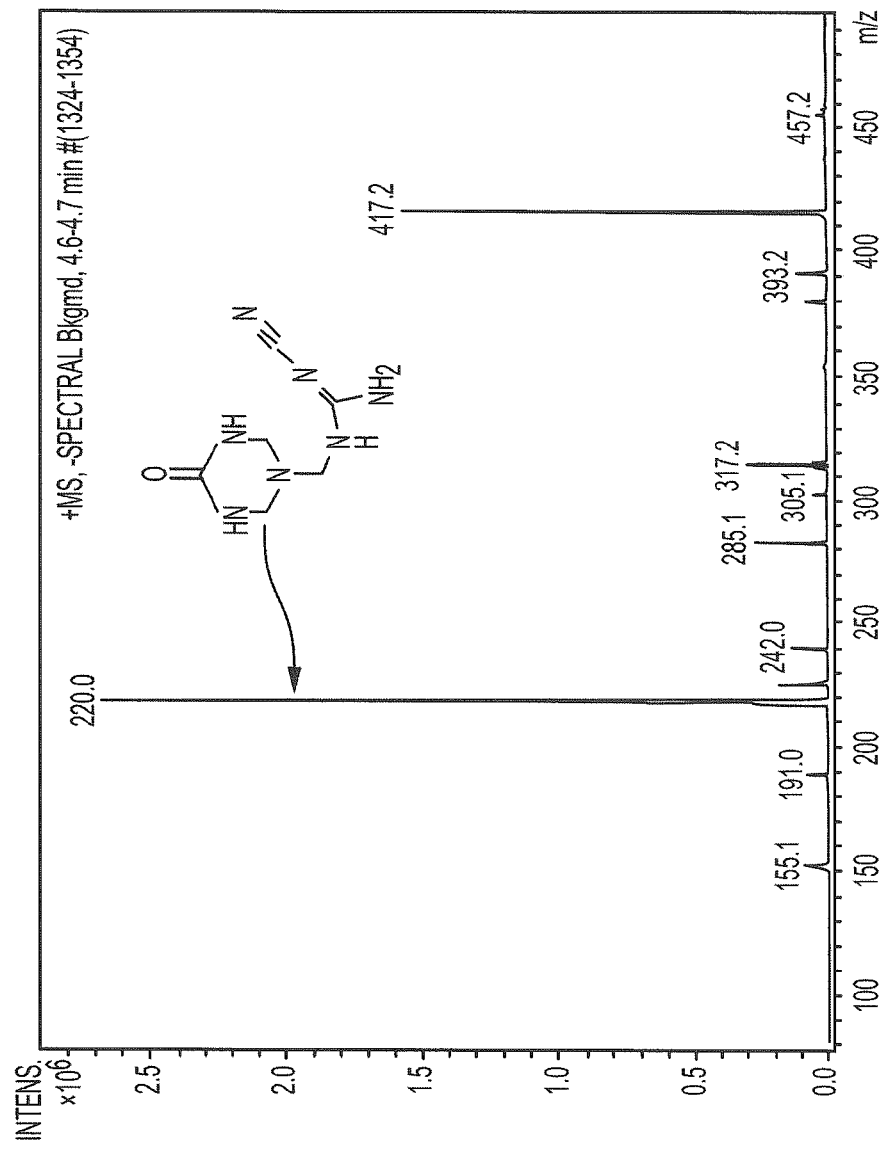
FIG. 2 is a printout of a mass spectral analysis of a reaction product according to embodiments of the present disclosure confirming the presence of the adduct Formula 5.
Figure 3:
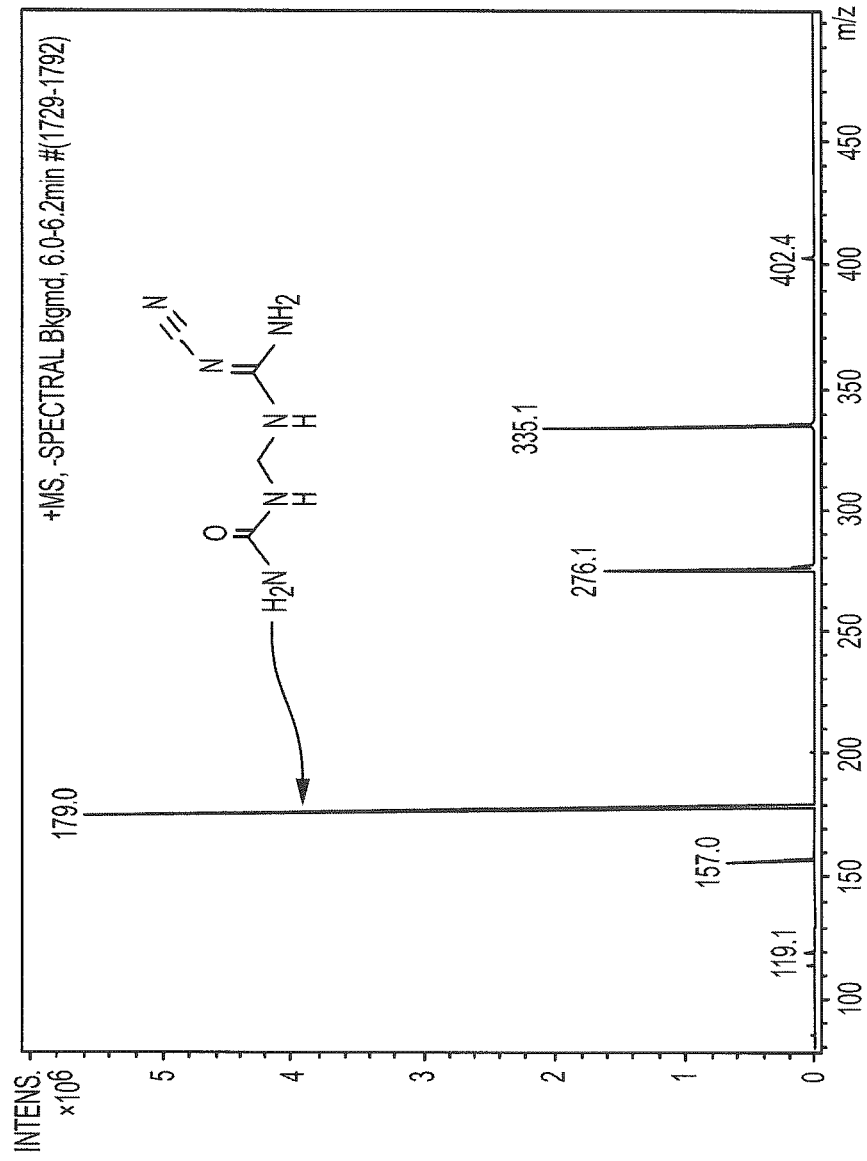
FIG. 3 is a printout of a mass spectral analysis of a reaction product according to embodiments of the present disclosure confirming the presence of the adduct of Formula 6.

Mass spectral analysis confirmed that peak 4 corresponds to the adduct of Formula 5, the recorded mass of 220.0 Da being the sum of the adduct mass (197.0 Da) and the sodium ion mass (23.0 Da). See FIG. 2. The analysis further confirmed that peak 7 corresponds to the adduct of Formula 6, the recorded mass of 179.0 Da being the sum of the adduct mass (156.0 Da) and the sodium ion mass (23.0 Da). See FIG. 3.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A fertilizer composition comprising
   (a) an adduct of formaldehyde, urea, and a nitrification inhibitor, wherein the nitrification inhibitor is incorporated into the adduct, and
   (b) a nitrogen source, wherein the nitrogen source is urea, ammonia, ammonium nitrate, or a combination thereof.

2. The fertilizer composition of claim 1, wherein the nitrification inhibitor is dicyandiamide (DCD).

3. The fertilizer composition of claim 1, wherein the nitrogen source is a solid, a liquid, or a mixture of a solid nitrogen source and a liquid nitrogen source.

4. The fertilizer composition of claim 1, wherein the composition further comprises a fertilizer nutrient.

5. The fertilizer composition of claim 1, wherein the composition further comprises a pesticide, herbicide, and/or fungicide.

6. A method of making a fertilizer composition comprising:
   reacting formaldehyde, urea, and a nitrification inhibitor to produce a reaction product including at least one adduct of formaldehyde, urea, and the nitrification inhibitor, wherein the nitrification inhibitor is incorporated into the adduct; and
   combining the reaction product with a nitrogen source to produce a fertilizer, wherein the nitrogen source is urea, ammonia, ammonium nitrate, or a combination thereof.

7. The method of claim 6, wherein the nitrogen source is a solid, a liquid, or a mixture of a solid nitrogen source and a liquid nitrogen source.

8. The method of claim 6, wherein the reaction product has a pH ranging from about 7 to about 11.

* * * * *